Patented May 25, 1954

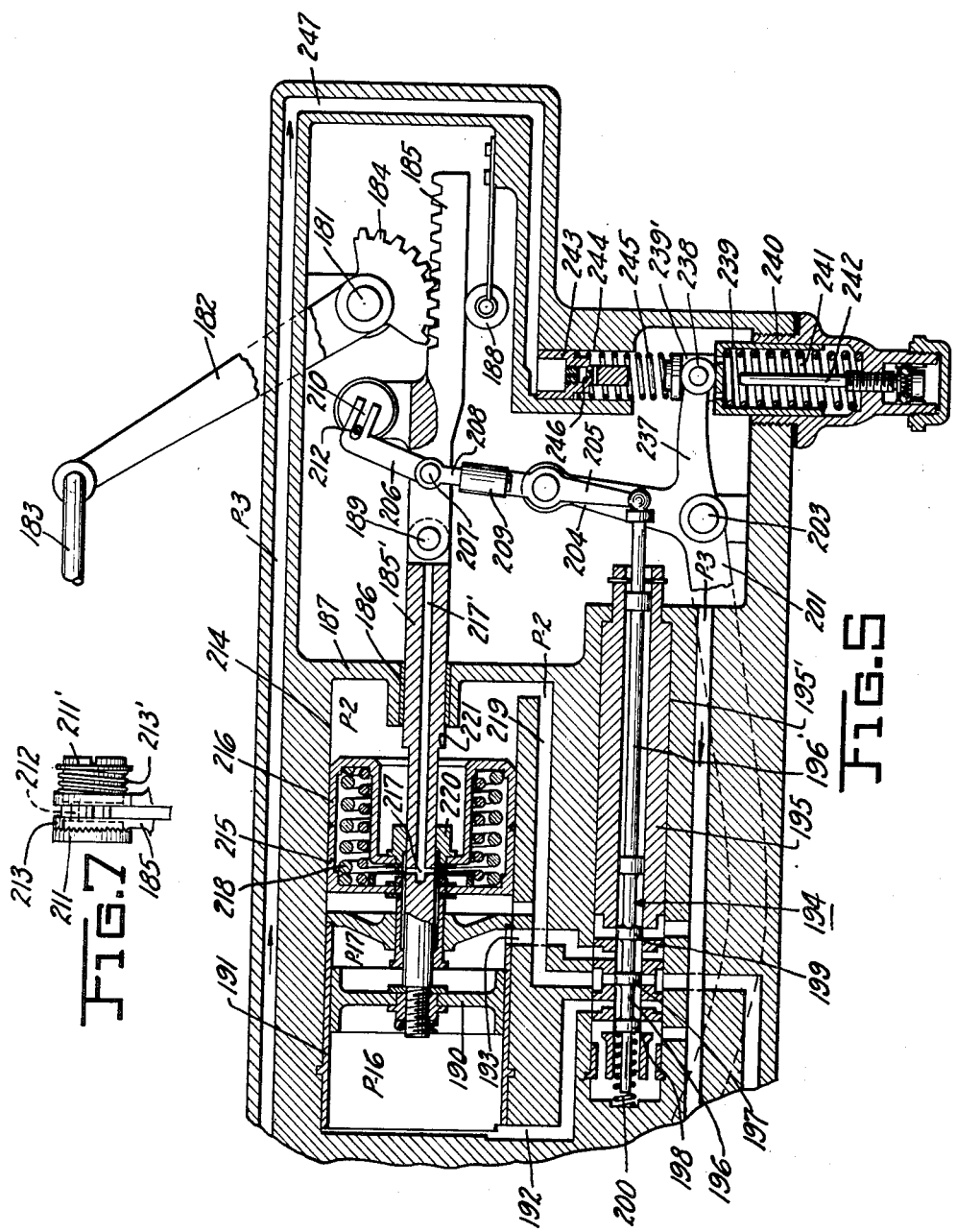

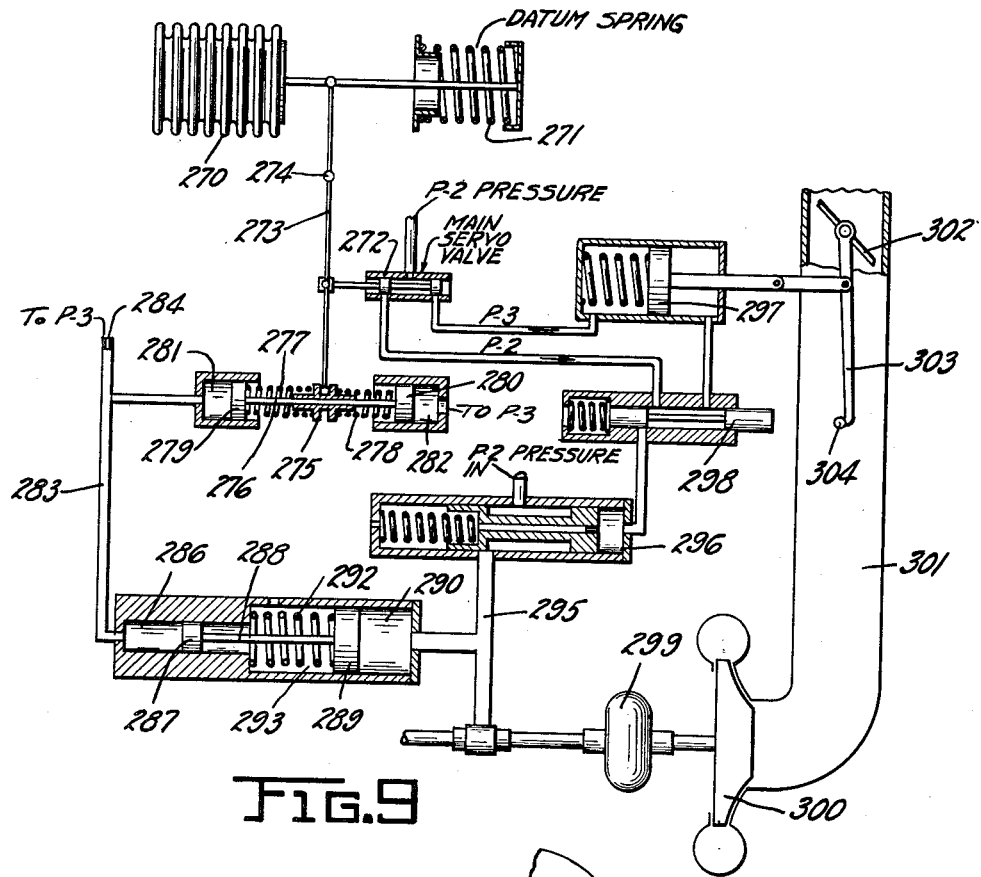
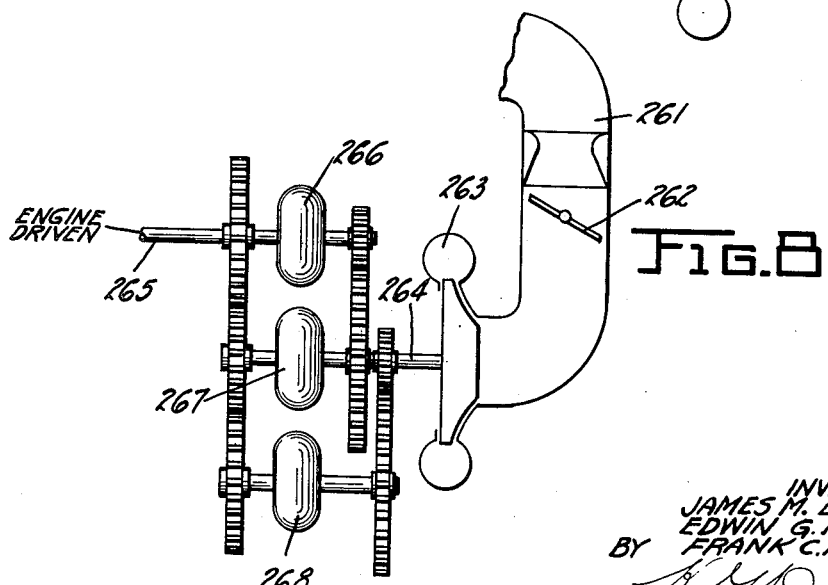

2,679,297

UNITED STATES PATENT OFFICE 2,679,297

CONTROL FOR INTERNAL-COMBUSTION ENGINES AND THEIR VARIABLE PITCH PROPELLERS

James M. Eastman, Edwin G. Keller, and Frank C. Mock, South Bend, Ind., assignors to Bendix Aviation Corporation, South Bend, Ind., a corporation of Delaware Application July 29, 1946, Serial No. 686,942

53 Claims. (Cl. 170—135.74)

This invention relates to controls for internal combustion engines, and particularly to boost and power controls for automatically maintaining a given power output at varying altitudes as determined by the setting of a power control lever or like control device.

An object of the invention is to provide an improved power control unit for use with an engine having a variable capacity supercharging system employing fluid pressure means for varying the ratio of engine-to-supercharger speed;

Another object is to provide improved power control mechanism for an engine having a variable-capacity supercharging system employing one or more fluid couplings for varying the engine-to-supercharger speed ratio which will maintain manifold pressure at a substantially constant value for a given setting of a power control lever or analogous member through automatic regulation of an air throttle or device having an equivalent function up to a point where charging capacity is approached or attained for wide-open throttle, and to thereafter maintain the set charging pressure by automatically controlling the admission of fluid pressure to said couplings;

Other objects include the following:

To provide an automatic power control unit of the variable datum type adapted for use with an engine having a throttle-controlled induction passage and a variable capacity supercharging system utilizing one or more fluid couplings for varying the ratio of engine-to-supercharger speed, incorporating an improved hydraulic control system which among other advantages requires a minimum of manual effort by a pilot or operator;

To provide a power control unit of the variable datum type for an engine having a variable capacity supercharging system including one or more fluid couplings for varying the ratio of engine-to-supercharger speed, wherein the datum mechanism acts automatically to not only adjust the throttle position up to charging capacity for wide-open throttle but also acts to shift the control from the throttle to a fluid metering device for metering fluid under pressure to said coupling or couplings;

To provide an hydraulically operated power control unit wherein a pilot may regulate the charging pressure and power output either automatically or manually, and in case of failure of the automatic control, the pilot will have immediate manual control;

To provide an automatic power control unit wherein the pilot will have manual control available in a selected range of manifold pressures, as for example, during the taxying range of throttle opening;

To automatically correlate manifold pressure and engine speed through the medium of a single power control lever with a minimum of manual effort;

To provide in a variable datum automatic power control unit improved means for manually overriding the datum setting in the cruise range;

To provide improved means in an hydraulic type of power control unit for stabilizing the operation of the control;

To provide in a power control unit means whereby different take-off settings may be had for engines having different characteristics;

To provide in an hydraulic type of power control unit means for circulating a relatively large quantity of fluid through the unit for warming up purposes, and for automatically returning the circulation of fluid to normal at any time desired after the warming up operation;

To provide means for conveniently overriding the upper limit of manifold pressure for introduction of an anti-detonating fluid such as water;

To provide means whereby the manifold pressure will follow a predetermined curve for a given power setting up to some given altitude or condition of air density as determined by the differential between scoop pressure and engine intake or manifold pressure and will thereafter "droop" or be held to a value such that heating due to a high rise across the supercharger will not produce detonation; and To generally improve power controls, particularly those of the hydraulic type.

The foregoing and other objects and advantages will become apparent in view of the following description taken in conjunction with the drawings, wherein:

Figure 5 is a schematic diagram of the propeller pitch or engine speed control unit;

Figure 6 is an enlarged section of the metering valve for the fluid couplings;

Figure 7 is a detail fragmentary view of part of an adjustment for the engine speed or propeller pitch control unit;

Figure 8 is a schematic diagram of a variable speed drive adaptable to an engine having a single stage supercharging system;

Figure 9 is a schematic diagram of the power control unit of Figure 2 but showing a modified form of damping system; and Figure 10 is a curve chart illustrating the action of the "altitude droop" mechanism.

Figure 1:
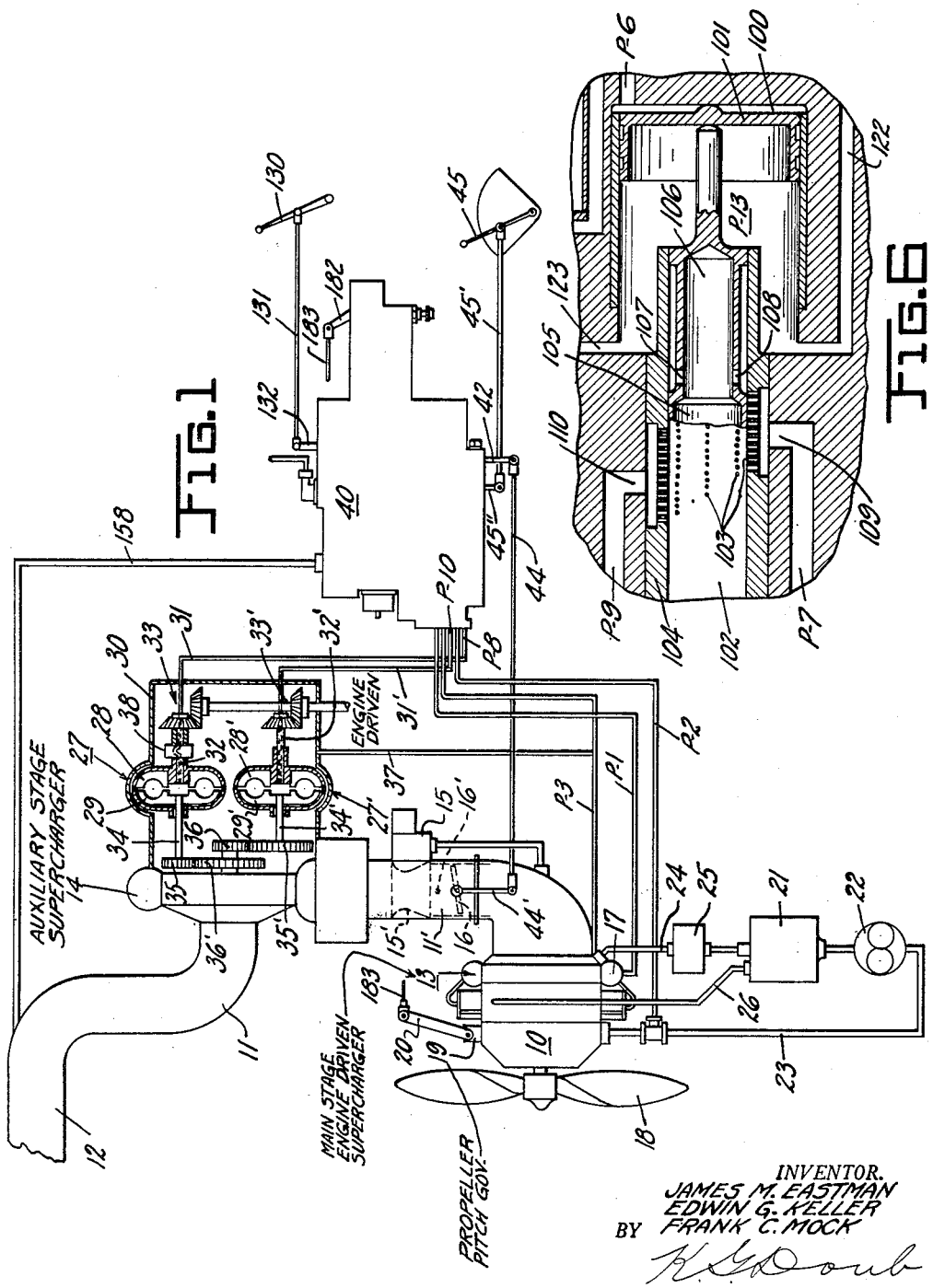
Figure 1 is a view in elevation of an aircraft engine having the power control unit of the present invention operatively connected thereto.

Referring to the drawings, and first to Figure 1, an aircraft engine is indicated at 10 having an air induction conduit 11, 11' which receives air from an air scoop or like device, part of which is indicated at 12. For the purposes of illustration, the air induction or input system is of the multistage type, including a supercharger 13 herein termed the "main stage," which is engine-driven with a fixed gear ratio and supplies pressure under all conditions of operation, and a supercharger 14 herein termed the "auxiliary stage" since it is regulated to supplement the supercharger 13 under certain conditions of operation, as at wide open throttle when the capacity of the main stage supercharger is reached. A charge forming device such as a carburetor is shown at 15 including a venturi 15', and posterior the carburetor is a throttle valve 16 for variably limiting the supply of air flowing to the intake manifold 17 of the engine and thence to the respective engine cylinders. While the throttle 16 is shown positioned posterior to the carburetor and anterior the supercharger 13, it may be located at any desired point in the induction system. A stop 16' limits the wide-open position of the throttle. The engine is equipped with a propeller 18, preferably of the variable pitch type, the pitch of the blades being adjustable through the medium of a governor 19 controlled by a lever 20. Since devices of this type have long been known and used for controlling the speed of aircraft engines and may be purchased as a complete unit in the open market, it is not shown in detail in the present instance, it being sufficient to state that the position of lever 20 determines the setting of the governor and hence engine speed at a given setting of the power control device, movement of the lever 20 to the left decreasing the pitch of the propeller blades and increasing engine speed for a given position of a power control lever hereinafter described and movement of said lever 20 to the right increasing the pitch and decreasing engine speed for a given position of said power control lever.

A pressure type oil supply system includes an oil tank 21 from which oil is taken by a pump 22 and delivered under pressure to the engine through conduit 23, scavenged oil being returned to the tank 21 through return line 24 and cooler 25. The engine may be vented to the top of the oil tank through line 26.

The drive on the auxiliary stage supercharger is transmitted from the engine or other suitable power source through variable speed hydraulic coupling units generally indicated at 27 and 27', which may be of similar construction and have similar operating characteristics. Hydraulic couplings of this type are well known in the art and may be purchased in the open market. In general, each unit consists of a driving rotor or impeller 28 and a driven rotor or vaned runner 29 mounted in a casing 30, oil under pressure being conducted to the unit through conduit 31. The rotor 28 is usually driven from a suitable power source through step-up or step-down transmission; in the present instance it is shown secured on a shaft 32 driven from the engine through gearing 33. The drive transmitted to the unit 27' is of a ratio higher than that of the unit 27 so that the two units will cover a range of speed sufficient to give the necessary auxiliary charging capacity. The rotor or vaned runner 29 drives a shaft 34 carrying a gear 35. Corresponding parts of the coupling unit 27' have been given corresponding reference numerals except that a prime (') has been added. The gears 35, 35' and 36, 36' form part of a transmission system for driving the supercharger 14.

Oil under pressure fed to the rotors through conduits 31, 31' reduces the slip between the driving rotors 28, 28' and the driven rotors or runners 29, 29', the amount of slip being in relation to the rate of feed of the oil. With little or no oil pressure, the rotors or runners 29, 29' simply idle or produce very little additional load on the system. A certain amount of oil thrown outwardly through bleeds formed in the rotors is returned to the drain system through conduit 37. The conduit 31 to the low speed coupling is controlled by a valve 38 operating to close the said conduit when the driven shaft 34 rotates faster than the driving shaft 32. This action causes the low speed coupling to automatically empty when the high speed coupling attains a predetermined speed and overdrives the low speed coupling, to thereby avoid loss of power which would otherwise be absorbed by the rotating oil-filled low speed coupling. The valve is shown schematically, since it forms no part of the present invention and may be obtained as a complete unit in the open market.

*Power control unit*

The various parts which go to make up the power control unit are mounted in a main casing or housing 40 and are shown schematically to avoid a multiplicity of sectional views. Basically, the device provides for control of manifold pressure by automatic and/or manual regulation of the carburetor throttle up to some predetermined altitude or condition of air density, usually termed the "first critical" and requiring a wide open throttle, and beyond this point, the manifold pressure is controlled by automatic regulation of the hydraulic couplings; the carburetor throttle control and hydraulic coupling controls being interconnected and correlated, preferably through a common aneroid and variable datum assembly. In addition, the unit may selectively incorporate additional controls and provisions for meeting the requirements of engines having different operating characteristics as well as special requirements of different engine manufacturers, an important advantage of the improved power control unit being its flexibility in this respect. To facilitate an understanding of the invention, the description has been broken down with respect to the several controls and their method of operation.

*Control through regulation of the carburetor throttle*

A main shaft 41 (Figures 2 and 4) is journaled in the housing 40 and has secured thereon exteriorly of the housing the one extremity of a lever 42, said lever being provided with an extension 42' projecting upwardly at a slight angle to said lever and carrying a stub shaft 42" rotatably mounting a pinion gear 43. The lower or opposite end of lever 42 is pivotally connected to the carburetor throttle by linkage 44, 44'. A main power control lever is indicated at 45; it connects through link 45' with a lever 45'' pivotally mounted on shaft 41, also externally of the casing 40, and at its upper extremity beyond said shaft the lever 45'' is flared and is provided with a laterally offset toothed segment 46 and a cam 47, which latter may be considered the speed control cam since it may be used to select engine speed according to a predetermined power setting of the main power control lever. The toothed segment 46 meshes with the pinion 43 carried by the extension 42' of the throttle lever 42, and said pinion in turn is in mesh with one set of teeth 48' of a segmental gear 48, loosely or pivotally mounted on the main shaft 41 and provided with another set of teeth 48'' in mesh with a toothed rack 49 secured on a piston rod 50 shown as of I-beam shape in cross-section, said rod 50 terminating at its opposite ends in pistons 51, 51' slidable in cylinders 52 and 53. In the cylinder 52 is a spring 54 which at one end abuts the piston 51 and normally urges it and consequently the rack 49 toward the extreme left hand position (closed throttle position), and at its opposite end engages in a recess formed in the rear end wall of the cylinder 52.

The rack 49 is actuated by fluid under pressure admitted to the cylinders 52 and 53 by a servo valve 55 (see Figure 3) whose position is determined by a variable datum manifold pressure assembly including an evacuated bellows or aneroid 56 mounted in a sealed chamber 57 defined in part by a cup-shaped wall 58 and in part by a diaphragm 59 whose central portion is clamped between a pair of reinforcing plates connected to a cup-shaped guide member 60 having an encircling bushing at one end mounted for limited sliding movement in a cylinder 61 and at its opposite end provided with a ball head slidingly mounted in a guide bore or passage 62 which is provided with a vent 62' to facilitate evacuation of the bellows, after which the vent may be closed by a screw or other suitable means and the vent sealed. The bellows may be evacuated to a low absolute value and rendered responsive to changes in pressure only, or it may be evacuated and loaded with a temperature responsive inert gas and a damping fluid to render the bellows responsive to changes in both temperatures and pressure; see U. S. patent to Mock et al., No. 2,376,711 for a suitable density responsive capsule of the latter type.

The datum of the bellows 56 is determined by variably loading a datum spring 63 which at one end abuts a piston 64 slidingly mounted in a cylinder 65 and at its opposite end abuts a thrust plate 66 forming part of a thrust bearing carried by an abutment or contact plate 67 secured on the one extremity of a datum rod or shaft 68, the opposite end of said rod or shaft having connected thereto a ball-headed bolt 68' which engages in a socket at the adjacent end of the guide 60 and provides a universal joint connection between the datum rod 68 and the movable end of the bellows 56. A sealing diaphragm 69 seals the space around the aneroid shaft 68. A datum cam 70 (Figures 2 and 4) is formed on the upper flared extremity of the lever 45 so as to be rotatable through adjustment of said lever, the cam 70 being engaged by a follower 71 mounted on the one arm of 72' of a lever 72, the latter also having an oppositely projecting arm 72'' mounting a cam follower 73 adapted to engage cams 74 and 138 under certain conditions and for a purpose to be described. Lever 72 is pivoted on a pin 75 projecting laterally from a stationary depending bracket 76. A lever 77 is pivotally mounted or fulcrumed at 78 to the follower lever 72 so as to be movable therewith. A compression spring 79 normally urges the follower lever 72 in a clockwise direction, tending to maintain the follower 71 against the cam 70. A link 80 is pivotally connected at one end to the lower end of lever 77 and at its opposite end is pivoted on a pin 81 (Figure 3) which is carried by a swinging arm 82 and also serves as a floating pivot or fulcrum for a servo lever 83 whose upper end is operatively connected to a servo valve 84, designed to control admission of fluid under pressure in back of the piston 64 in a manner to be described. The lower end of lever 83 is contoured to engage the piston 64, being held against it by the action of servo valve spring 84'; and the relative dimensions of said lever and the parts which make up the floating pivot 81 therefor are such that the travel of pivot 81 acts to move servo valve 84 in a direction to cause oil pressure change in back of piston 64 to move said piston and lever 83 and return servo valve 84 to the position shown, thereby setting the load on spring 63 in accordance with the travel of pivot 81 to determine the datum setting. Utilizing a servo-motor to tension the datum spring relieves the pilot of considerable manual effort to effect this operation.

A servo lever 85 is pivoted or fulcrumed at 86 to a stationary bracket, and at its upper end said lever is engaged by contact plate 67 and at its lower end engages and actuates servo valve 55 to the left against the tension of springs 87, 87' mounted in a cylinder 88 and having a damping piston 88' interposed therebetween.

The various operating pressures in the flow ducts, servo valve ports, servo piston cylinders and like chambers and passages have been designated as follows:

P–1—engine manifold air pressure
P–2—engine oil pressure
P–3—drain oil pressure
P–4—throttle-opening piston pressure
P–5—throttle-closing piston pressure
P–6—coupling valve piston pressure
P–7—metered oil to low coupling
P–8—feed oil to low coupling
P–9—metered oil to high coupling
P–10—feed oil to high coupling
P–13—feedback damping piston pressure
P–14—aneroid chamber pressure
P–15—datum piston pressure
P–16—propeller speed increasing piston pressure
P–17—propeller speed decreasing piston presure
P–18—atmospheric or scoop pressure The high pressure fluid (P–2) is indicated by inpointing arrows where it enters the unit from the engine oil system to the servo valve 55. This valve may be considered the main servo valve, since it controls the flow of high pressure fluid to the throttle pistons 51, 51', and also to the coupling valve piston 101 to be described. From valve 55, the flow may be readily traced by following the various channels designated as above indicated. High pressure oil also branches off from the P–2 entrance channel before the latter reaches the valve 55 for initiating certain operations which will subsequently be described.

Operation of throttle control

At sea level, with the throttle nearly closed and the engine idling, the parts will occupy substantially the positions shown in the drawings. At this time, cam follower 71 is in engagement with the low portion of cam 70 and the floating pivot 81 is in the neighborhood of its left-hand position, or in a position such that the datum spring 63 is loaded with but a moderate force which is insufficient to prevent partial collapse of bellows 56, even though the manifold pressure is relatively low during idling. Also, at this time the servo valve 55 will be in a position such that the oil pressure P-4 in piston chamber 53 is at a minimum and pressure P-5 in piston chamber 52 plus spring 54 will have moved pistons 51, 51' to the left-hand position, thus substantially locking the gear 48 against rotation.

If the power control lever 45 is now moved a limited distance to the right, gear 46 will be rotated counterclockwise, rolling pinion 43 in a similar direction and turning throttle lever 42 counterclockwise, thereby opening the throttle 16. Throughout a certain predetermined low power range of control, the servo valve will be in a position such that piston chamber 53 will be open to drain and piston chamber 52 open to P-2 pressure, forcing throttle pistons 51, 51' to their extreme left-hand positions, this being the range of direct manual control. Should lever 45 be moved to the right to a position such that the cam 70 (acting through lever 72, link 80, floating pivot 81 and servo valve 84), increases the load on the datum spring 63 to a point such that the spring force overcomes the pressure tending to hold the bellows 56 collapsed, datum rod 68 will move to the right and move servo valve 55 to the left to a point where high pressure fluid P-2 will pass to chamber 53 and oil will drain from chamber 52. Throttle pistons 51, 51' will now move to the right, and acting through rack 49 and gear 48, will roll pinion 43 counterclockwise on gear 46 and open the throttle 16. The control now becomes automatic, or the boost control takes over, the pilot selecting the degree of manifold pressure by positioning cam 70 which in turn locates the floating pivot 81. If while in the automatic range of control, the pilot moves lever 45 in a power-increasing direction, pivot 81 is repositioned to the right and servo-lever 83 is also moved to the right, permitting servo-spring 84' to move servo valve 84 to the right so that high pressure fluid P-2 will pass to P-15, moving piston 64 to the right and compressing datum spring 63. Should this force be sufficient to overcome the pressure tending to hold bellows 56 collapsed, datum rod 68 moves to the right and acting through servo-lever 85 moves servo valve 55 from its equilibrium position to the left. High pressure fluid then flows from P-2 to P-4 and fluid is also drained from P-5 to P-3, and pistons 51, 51' move to the right and open the throttle to a point where the increased manifold pressure balances the datum spring load or datum setting.

To reduce power output while in the automatic range of control, lever 45 is moved to the left, cam 70 permits compression spring 79 to reposition floating pivot 81 to the left and lever 83 then moves servo valve 84 from a neutral or equilibrium position to the left and opens P-15 to drain. Piston 64 and datum rod 68 now move to the left and servo valve 55 to the right. High pressure oil then flows from P-2 to P-5 and oil is drained from P-4 to P-3, whereupon pistons 51, 51' move to the left and rack 49 acts through segmental gear 48 and pinion 43 to move throttle lever 42 in a direction to close the throttle 16 and reduce manifold pressure until the pressure on the right side of diaphragm 59 and in chamber 57 balances the new datum setting.

Should there be a decrease in air density, as by a gain in altitude, pressure P-1 at the right-hand side of diaphragm 59 and the pressure P-14 in chamber 57 will likewise decrease, and the aneroid will tend to expand or extend itself, thereby moving datum shaft 66 to the right, turning servo valve lever 85 clockwise and moving servo valve 55 to the left. High pressure oil then flows from P-2 to P-4 and oil is also bled from P-5 to P-3, and pistons 51, 51' move to the right, turing segmental gear 48 counterclockwise and rolling pinion 43 to the left, thereby moving throttle lever 42 to the right or in a direction to open the throttle and increase the manifold pressure until the pressure on the right of diaphragm 59 and in chamber 57 balances the datum setting of the spring 63.

Should there be an increase in air density as by a drop in altitude, pressure P-1 at the right of diaphragm 59 and pressure P-14 in chamber 57 will likewise increase, bellows 56 will tend to collapse, thereby permitting datum spring 63 to move datum shaft 66 to the left, whereupon servo valve 55 will move to the right due to pressure of springs 87, 87'. Pressure oil then flows from P-2 to P-5 and oil is drained from P-4 to P-3, whereupon pistons 51, 51' move to the left, rack 49 acts through segmental gear 48 to roll pinion 43 to the right, thereby moving throttle lever 42 to the left or in a direction to close the throttle valve 16 and reduce manifold pressure until P-1 on the right side of diaphragm 59 balances the datum setting of spring 63.

Should oil pressure, either intentionally through manipulation of valve 89, to be described, or through leakage or other causes, be shut off from the unit or the oil channels which conduct operating pressure to the pistons 51, 51', spring 54 will move said pistons to the left-hand position thereof, the closed throttle position. Manual control for the full stroke of lever 45" is then attainable, which may range from closed-up to a throttle-opening position limited only by the throw of the pilot's lever 45 and/or the effective travel of the inter-engaging differential gearing 43, 46, 48. In actual practice, manual control has been found desirable from a fully closed-up to approximately one-half throttle opening.

When pistons 51 and 51' are in their throttle-closing position to the left, should the lever 45" and the cam 70 be set to call for a manifold pressure which is below that which said pistons will allow when in this position, the latter will be pushing against a stop in an effort to further close the throttle. However, since the pistons cannot move any further toward the left, the actual throttle position will be determined solely by the lever 45" acting on pinion 43 through segment 46. Some engine manufacturers desire to have a power control unit which will give manual control over a low range only of throttle opening, for example, during the so-called "taxiing" range, which is equivalent to control lever positions from idle to a position slightly below that for minimum cruise power. If such limited manual control is desired, it is only necessary to provide cam 70 with a contour such that it will call for manifold pressures which are lower than can be obtained by manual control for that part of the main control lever travel, but which, when a setting approximating minimum cruise is reached, will equal the setting obtained by manual control of the throttle. From this point on, the contour of cam 70 will call for manifold pressures greater than can be obtained through manual control of the carburetor throttle, so that the settings are obtained automatically.

Loosely mounted on the main shaft 41, or mounted for relative movement with respect to said shaft, is a lever 90 having an angular portion above and to the left of the shaft 41 defining a stop 90'; and that portion 42' of the lever 42 which carries the pinion gear 43 is provided with an adjustable stop 91 adapted to engage the stop 90' when the throttle valve reaches a predetermined open position. The lever 90 has a depending knob or ballhead adapted to engage in a recess or slot provided in the adjacent adjustable extension 92' of a valve 92, said extension overlying the stem of a valve 93 having thereon an upstanding boss or projection 93'. Valve 92 is normally urged toward its left-hand position, as shown, by a spring 94. The stem of valve 93 continues on to the right under the extension 92' and has its upturned end spaced from the downturned end of said extension, to provide a lost-motion connection 95 for a purpose to be described. A spring 94' normally holds valve 93 to its left-hand position, as shown.

Valve 93 has a land 96 which is adapted to close off channel P-4 across the valve and hence oil from cylinder 53 when the throttle is in wide open position, and another land 97 which is adapted to close off high pressure oil to a "warm-up" drain bleed when the throttle reaches wide open position and which will later be described. It is desirable to stop the travel of piston 51' when the throttle is wide open since at that time the carburetor throttle 16 will be holding the lever 42 and pinion 43 against further movement to the right, and if the piston 51' then has full oil pressure exerted thereon, the resulting force will be transferred through pinion 43 and the internal gear segment 46 to levers 45" and 45 and tend to move the latter to a lower setting. If the pistons 51, 51' were stopped just before wide open throttle is reached, it would not disturb the setting of the power lever, but since this may not be the case, the valve 93 is preferably moved to the right until just before wide open throttle is reached, land 86 cuts off oil pressure to piston 51, stopping travel of the throttle piston assembly and preventing the action above described.

The action of the piston cut-off valve 92 is based on throttle position. If the throttle opens too far, the valve completely closes, cutting off oil to piston chamber 53. Spring 54 will then tend to move the pistons 51, 51' to the left, oil being forced from chamber 53 through bleed 99' to drain. (Note that there is also a circulation bleed 99 in piston 51.) However, as the throttle pistons start moving back or to the left, the valve 92 starts opening and pressure P-2 is built up in piston chamber 53 to hold the pistons open or to the right. Thus the pistons will be stopped when the cut-off valve 92 is positioned to supply P-4 pressure to chamber 53 sufficient to hold the pistons in balance with other existing forces. A negligible motion of cut-off valve 92 and consequently the pistons 51, 51' in either direction will then produce sufficient change in such pressure to balance any possible variation in forces on the pistons, so that as long as the main servo valve 55 supplies the necessary P-4 pressure, the throttle will hold a substantially fixed open position as determined by the cut-off valve. Reaction forces tending to reset the datum may be avoided by attaining such fixed open position before the throttle 16 has opened far enough to contact the stop 16'.

Valve 92 has a land 98 adapted to close off communication between ports P-6' and P-6" up until the throttle reaches a certain position, for example, three-fourths open, after which it communicates said ports and permits flow of high pressure oil to hydraulic piston 101, to be described.

Control of hydraulic couplings

When the throttle approaches its fully open position, lever 90 first moves valve 92 to the right due to lost motion connection at 95, opening communication between ports P-6' and P-6", and then it also moves valve 93 to the right, stopping travel of piston 51, 51'. Upon further extension of aneroid 56 due to a further decrease in air density, lever 85 moves valve 55 sufficiently far to the left to permit high pressure oil to flow from P-2 (right-hand branch passage) to P-6, whereupon high pressure oil flows to cylinder 100 (Figures 2 and 6) in which piston 101 is mounted and has connected thereto a fluid coupling oil metering valve 102. As valve 102 moves to the left, it uncovers a series of metering orifices 103 formed in the wall of a cylinder 104. The action of these metering orifices is generally similar to that of a metering valve; in practice and as shown in Figure 6, they consist of a series of holes formed through the walls of the valve cylinder and arranged in spiral or screw formation and of gradually increasing flow capacity, or in a manner such that there is an increase in oil or fluid delivery in substantially direct relation to the linear movement of the valve. High pressure oil may pass from chamber 105, through axial passage or hollow center 106 of valve 102 and out through ports 107 into space 108, from which it flows through the metering orifices 103 as the valve progressively moves to the left and out through ports 109 and 110 into channels P-7 and P-9.

Each position of the valve 102 corresponds to a definite oil flow to one or more of the couplings and hence corresponds to a definite supercharger speed and a definite manifold pressure (assuming a given condition of flight). In order to maintain this predetermined flow relationship irrespective of variations in operating fluid pressure, means in the form of regulator valves 111 and 112 are provided for maintaining a constant pressure drop through each port 109 and 110. These regulator valves may be of any preferred type; as here shown, each consists of a cylinder 113 in which a piston 114 is slidingly mounted and is adapted to control a port 115 for the regulator valve 112 and 115' for the valve 113. Each piston is urged toward closed position by a spring 116 having a substantially low spring rate so as to maintain a substantially constant differential across the valve. Thus, should the pressure of the engine oil system (P-2) vary due to wear or other causes without a like variation of P-7 or P-9, or should the pressure on the P-7 or P-9 side of the valve vary at a given pressure of P-2, the differential across the pistons 111 will vary only momentarily until the spring 116 reestablishes the differential.

Operation of coordinated throttle and hydraulic coupling control

Preferably the extension 92' of valve 92 is adjusted so that when the throttle has been opened to some predetermined position, for example, three-fourths of its range of angular travel, the valve 92 will begin to open and communicate the ports P-5 and P-9. When the throttle is between this position and wide open, valve 55 can admit high pressure oil P-2 into channel P-6 and thence to cylinder 100 and cause movement of piston 101 to the left carrying valve 102 therewith. As the valve 102 moves to the left, oil first starts metering into channel P-7, across the port 115 and thence into feed oil channel P-8 which feeds oil into conduit 31 to the low speed coupling 30. As the pressure increases in this coupling, the speed of the supercharger 14 correspondingly increases and builds up the manifold pressure to a value corresponding to the setting of the power control lever 45. Increasing the datum setting and/or increasing altitude will tend to further open the servo valve 55 and increase the pressure in channel P-6, causing the valve 102 to progressively move to the left, uncovering the metering orifices 103 and first metering oil to the low pressure coupling through channel P-7 and then to the high speed coupling through channel P-9. When the oil flow P-8 is great enough to drive the low coupling 27 at minimum slip and the oil flow P-10 to high coupling 27' becomes great enough to drive the supercharger at even higher speed, automatic engine valve 38 will cut off line 31 communicating P-8 to low coupling 27. Preferably, there is a predetermined amount of overlap between the ports 109 and 110 so that a minimum travel will be required of valve 102 between the points where oil flow P-8 drives low coupling 27 at minimum slip and where oil flow P-10 is great enough to cause high coupling 27' to overdrive and close valve 38. Further increase in the supply of oil to the high speed coupling will further accelerate the supercharger 14 until a maximum supercharger speed is reached at minimum slip of the high speed coupling.

The action of the aneroid 56 is basically the same in both control by manipulation of the throttle and by feeding oil to the variable speed couplings for the supercharger 14. When the throttle is wide open, the servo valve 55, by varying the feed of oil to the conduit P-6, positions the coupling valve 101 instead of positioning the pistons 51, 51' and the carburetor throttle. Should the manifold pressure temporarily decrease at a given datum setting, datum spring 63 will pull the shaft 68 to the right, moving servo valve 55 to the left and venting high oil pressure through the channel P-6 to the end of piston 100. As the valve 102 moves to the left and increases the drive on the supercharger 14, the latter will accelerate until the manifold pressure is restored to its correct value, whereupon the aneroid 56 acts to restore the servo valve 55 to its normal position and reduce the flow of oil to the piston 101, thus stopping the travel of the valve 102 and holding the supercharger speed at a point necessary to maintain the manifold pressure datum setting as determined by the position of power control lever 45. Should the manifold pressure temporarily increase at a given datum setting, the travel of the servo valve 55 will be to the right, whereupon oil pressure to the right of piston 101 in the cylinder 100 is bled out through channel 117 and bleed 117' instead of being vented by the servo valve E to the oil drain channels P-3, and the valve 102 is returned or moved to the right.

Since there is a range in which the manifold pressure is controlled both by the carburetor throttle and the oil couplings, it is desirable to make some provision so that the throttle will always go wide open before a partially open equilibrium position of the coupling valve 102 can be obtained. For this reason, when the servo valve 55 is positioned to maintain holding pressures P-4 and P-5 on the opposite ends of pistons 51' and 51 and the carburetor throttle is stopped at less than wide open position, the coupling control land on the servo valve 55 is located so that the pressure transmitted to piston 101 through channel P-6 is cut off from high pressure oil in channel P-2. However, a slight displacement of the servo valve 55 from this equilibrium position will then feed high pressure oil to the channel P-6 which operates the piston 101. As a result there may be a slight shift in the neutral or normal position of the servo valve when a change from regulation by way of carburetor throttle to regulation by way of the oil coupling control valve 102 takes place. This shift should be very slight and will correspond to a very slight change in the manifold pressure setting, say for example about one-fourth inch Hg. Thus, in the range between, for example, three-fourths throttle opening to wide open throttle, the latter will control the setting of the valve 55 and any equilibrium position thereof will correspond to a closed position of the coupling control valve 102. However, the coupling control valve 102 is always ready for prompt response when acceleration is desired.

Stability and damping system

In order to maintain an optimum boost control response characteristic and to avoid instability that may result from a too rapid response, it is desirable to provide means for combatting any tendency of the control to surge. For the coupling control valve 102, it may be desirable to have a relatively rapid travel to the left or in an opening direction, which can be accomplished by suitably calibrating the servo lands and coacting ports which control the admission of high pressure fluid to the piston 101. On the other hand, return travel of the valve 102 may be much slower, which may be regulated as desired by suitably calibrating the bleed 117'. Should the action of the valve 102 result in overspeeding of the supercharger 14 to a point where it tends to raise the manifold pressure P-1 above a given setting of the datum control, the carburetor throttle will act to hold down the manifold pressure by moving toward a closed position until the supercharger slows down and again takes over. When the supercharger is being decelerated, if it should underspeed and produce too low manifold pressures in the high power range, the carburetor throttle being already at or near wide open position, is not able to immediately correct by further opening, but it can rapidly lower the manifold pressure in the event the valve 102 is too slow on its return. Hence the coupling valve may be permitted a relatively slow return movement.

Figure 2:
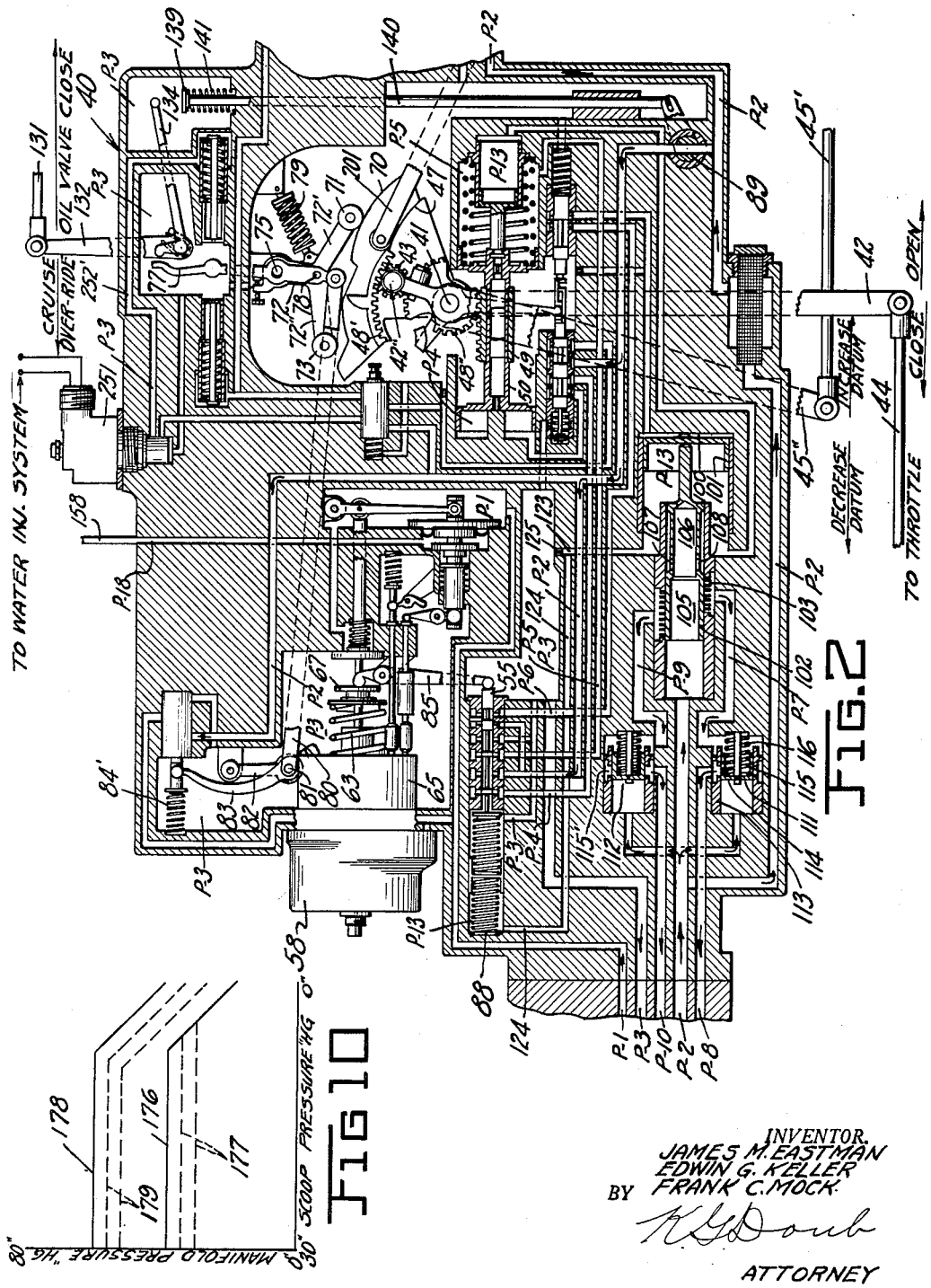
Figure 2 is a schematic diagram of the power control unit with the engine and supercharger drive system omitted.
Figure 3:
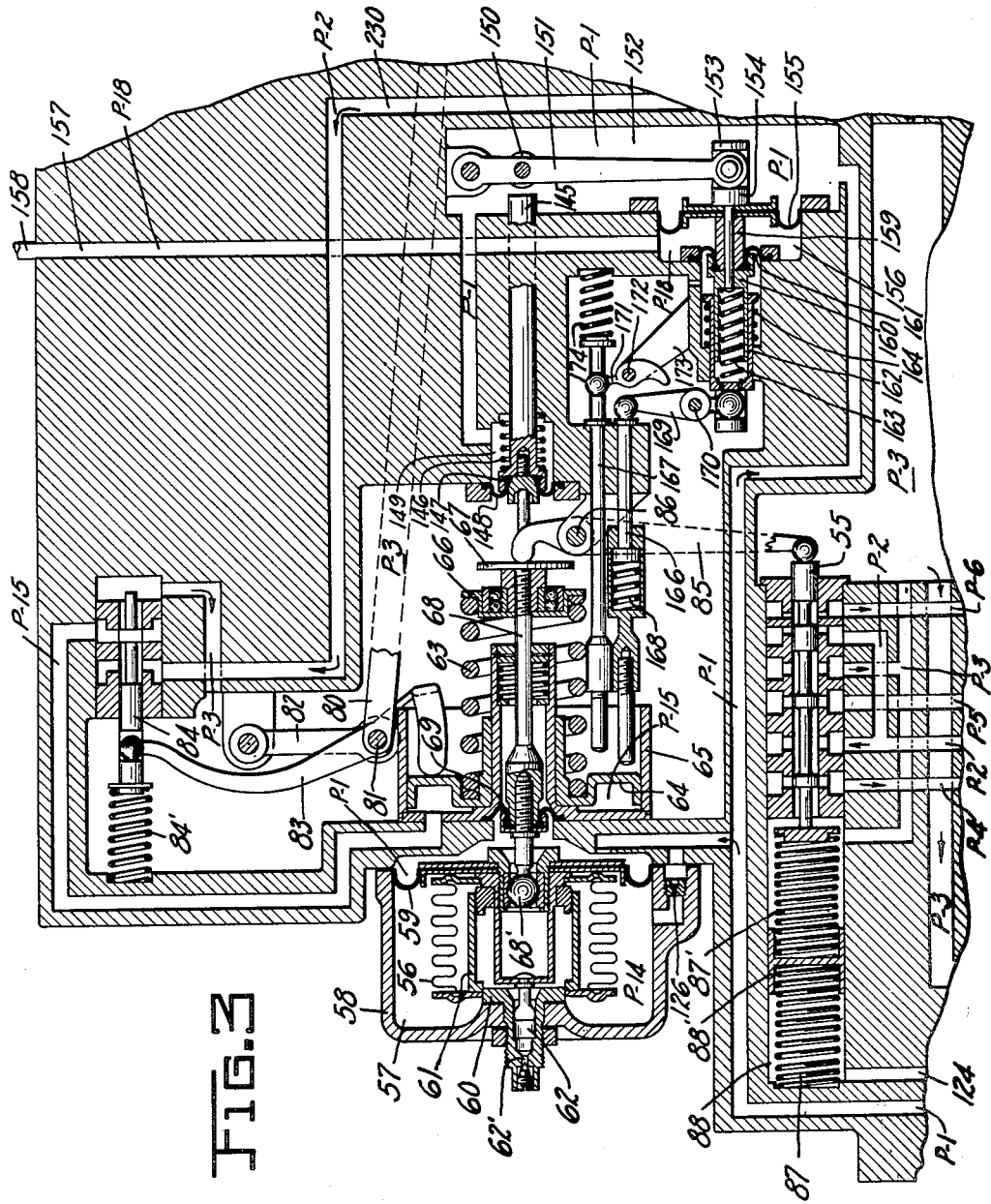
Figures 3 and 4 are sectional views of portions of Figure 2 enlarged to more clearly show the parts.
Figure 4:
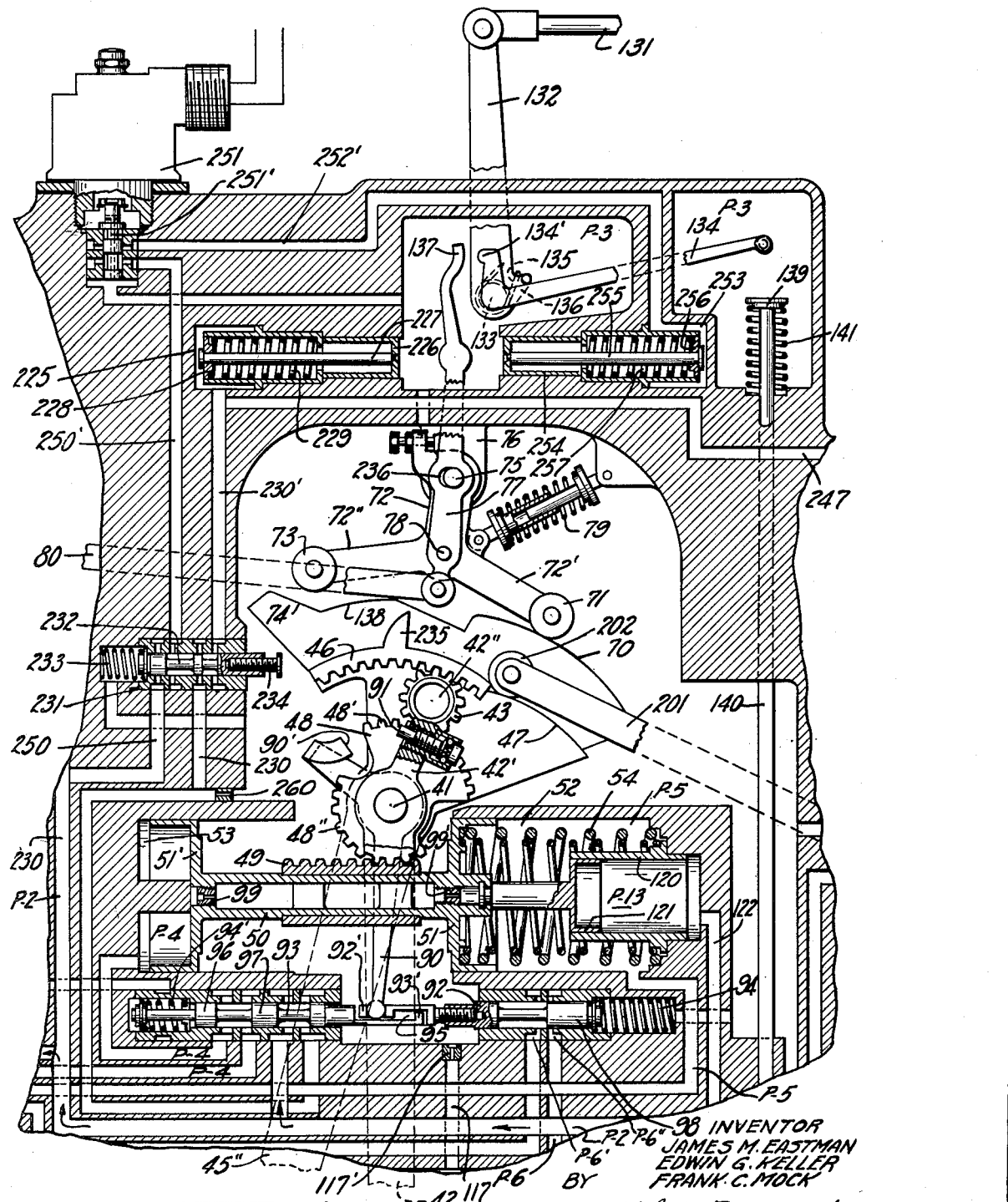

However, additional damping and stabilizing means may be necessary, and in the control unit as shown in Figures 2, 3 and 4, the throttle pistons 51, 51', coupling valve piston 101 and aneroid 56 are damped in a manner such as to prevent the manifold pressure from overrunning or overshooting when it approaches a given datum setting.

In cylinder 52 is mounted a smaller cylinder 120, and piston 51 has connected thereto a damping piston 121 mounted to slide in the cylinder 120. A channel 122 communicates the cylinder 120 with the cylinder 100 on the left-hand side of the piston 101, and cylinder 100 communicates with cylinder 88 by way of channels 123 and 124. In this manner, the damping pressure P-13 in back of pistons 121 and 101 is vented to the space in back of damping piston 88' for the servo valve 55. A bleed 125 communicates channel 123 with the drain system, and hence a pressure is developed on piston 88' which varies with the rate of travel of pistons 51, 51' and/or valve piston 101, and this force is carried through spring 87, servo valve 55, servo lever 85 and shaft or rod 68 to the aneroid 56 and produces a change in datum setting in the same manner as does a change in loading of the datum spring 63. When pistons 51, 51' and 101 are not in motion, piston 88' returns to its equilibrium position (the position shown) and relieves the resetting load on aneroid 56, so that the normal setting again governs. Thus, when the manifold pressure approaches a given datum setting, the latter is temporarily changed to meet the manifold pressure. As the manifold pressure then starts to overshoot this false setting, the latter will return to the correct setting as determined by the datum cam 70 at what might otherwise be the peak of an overshoot curve.

The diaphragm 59 also places a load on the aneroid 56 whenever the manifold pressure is changing rapidly. Here again a temporary resetting force is produced tending to change a given datum setting. The right side of said diaphragm is exposed directly to manifold pressure P-1, while the left side thereof, chamber 57, is vented to manifold pressure through restriction 126. Thus, when manifold pressure changes rapidly, the pressure P-14 in chamber 57 will lag behind the manifold pressure P-1, and this lag acts as a force tending to momentarily change the datum setting. As the manifold pressure approaches this false setting, it stops changing and the pressure P-14 will equalize with pressure P-1, thereby cancelling the resetting force.

*Cruise override with common lever for selecting manual control*

In certain power plant installations, it is desired to have a plurality of power settings available to the pilot within the cruise range; for example, one for cruising at relatively low brake mean effective pressure for best performance, and another at higher brake mean effective pressure for best fuel economy.

In the invention as herein disclosed, cruise override control is preferably had by a lever 130 separate from the main power control lever 45, the arrangement being such that the pilot has complete control by the main power lever irrespective of the position of the cruise override lever. Lever 130 is connected by link 131 with lever 132 journaled on, or mounted for rotative movement by means of, a pin or stub shaft 133 carried by the housing 40. Also mounted on shaft 133 for movement relatively to lever 132 is another lever 134 which has a bell crank arm constituting a contact member 134'. A preloaded leaf spring 135 partly encircles the shaft 133 and at one end bears against an abutment 136 forming part of lever 132 and at its opposite end engages the contact arm 134', the said abutment 136 being adapted to engage the lever 134 when lever 132 is rotated in a counterclockwise direction. It will be seen that when the lever 132 is rotated counterclockwise, there is an impositive or resilient connection between it (lever 132) and lever 134, but when lever 132 is rotated clockwise, it has a positive turning action on lever 134.

The lever 77 heretofore described is extended upwardly and provided with a contact 137, and when lever 132 is rotated counterclockwise, 134' engages 137 and raises cam follower 71 clear of datum cam 70, at the same time increasing the manifold pressure datum, which acts back through servo valve 55 and pistons 51, 51' to open the throttle. The counterclockwise travel of lever 132 has a predetermined limit corresponding to maximum cruise manifold pressure. Should the main power control lever 45 be set at a point above the setting of the cruise override lever 130, cam 70 will again contact cam follower 71 and move contact 137 clear of 134'. On the other hand, should the main power lever 45 be set at a point below minimum cruise position of lever 130, as for example idle position, cam follower 73 will engage cam 74 (which is integral with datum cam 70 and also turns with lever 45'') and turn lever 77 clockwise until cam follower 71 again rides on cam 70, the differential motion between levers 132 and 134 being taken up by spring 135. Thus, the cruise override lever does not have to be moved from any given override position in order to get manifold pressure settings by the main power lever above maximum cruise setting or down to idle setting.

Should the pilot wish to throw the control unit into full manual control, lever 130 is turned to its extreme right-hand position, causing lever 132 to turn lever 134 to a point where its free end engages plunger 139, and the latter then acts through rod 140 to close valve 89 and shut off operating fluid from servo valves 55 and 84, whereupon pistons 51, 51' will be forced to the left by spring 54 and manual control is had in the manner heretofore described. Plunger 139 is normally biased to return position by a spring 141.

*Manifold pressure limitation under charge heating conditions*

In certain types of engine installations, notably single stage engines where no cooler or intercooler is employed, it is sometimes deemed desirable to set an upper limit on the manifold pressures which the automatic control can produce at the highest supercharger rise ratios, or at high altitudes where the differential between air inlet or scoop pressure and manifold pressure attains its highest value for a given speed of the supercharger, since under these conditions, there is considerable heating of the charge and this may result in severe detonation and damage to the engine.

The right hand or free end of datum rod or shaft 68 slidingly projects into a bore formed in the adjacent end of a contact and guide rod 145, the latter being formed with an enlargement defining a shoulder against which the one end of a spring 146 abuts and serves to normally urge the said rod 145 to the left in abutting engagement with the datum rod or shaft 68. A fitting 147 is threaded into the enlarged end of rod 145 and clampingly engages the central portion of a balance diaphragm 148 forming a movable wall of a manifold pressure chamber 149 and functioning to compensate for oil drain pressure (P-3) acting on the right-hand side of sealing diaphragm 69. The outer free end of the rod 145 is adapted to engage a roller 150 carried by a lever 151 pivotally anchored at its upper end to a depending lug formed on the adjacent portion of the housing 40. The lever 151 depends into an elongated chamber or passageway 152 and at its lower end is provided with a roller engaging in a recess formed in a yoke-shaped fitting 153 secured on the outer end of a rod 154. A diaphragm 155 forms a movable wall between a scoop pressure chamber 156 and the lower extremity of chamber or passageway 152 and may be vented to scoop pressure by means of passageway 157 and pipe or conduit 153. The central portion of diaphragm 155 is clamped between a pair of reinforcing and stiffening plates which are in turn clamped between the member 153 and a bushing 159, the latter at its left-hand end projecting into the adjacent enlarged end of a cylindrical member 160 and a sealing diaphragm 161 being clamped between the bushing 159 and member 160 at this point. A sleeve 162 is slidingly telescoped on the member 160 and is normally urged to an extended position toward the left by a spring 163. Another weaker spring 164 is disposed around the flanged extremity of sleeve 162 to hold the parts of the assembly against looseness and rattling.

Mounted for sliding movement in a boss or projection formed on the housing 40 are a pair of datum limiting rods 166 and 167, each having its free left-hand end provided with a threaded extension for adjustability. The rod 166 is of two-part construction with one part telescoped over the adjacent end of the other and having a spring 168 interposed therebetween; and at its righthand end, said rod 166 is in contact with the upper end of a lever 169, fulcrumed at 170 and at its lower end engaging in a yoke-shaped extension of the sleeve 162. The rod 167 has its right-hand extremity notched for receiving the upper ball-shaped end of a lever 171 which is fulcrumed at 172 on a relatively stationary lug 173, said rod 167 being normally urged to its left-hand position by a spring 174.

Manifold pressure is conducted to chamber or passageway 152 and thence to chamber 140 by way of conduits having the pressure designation P-1 as shown.

The terms "manifold pressure droop" or "altitude droop" as used herein refer to the action which takes place when the differential between manifold pressure and scoop or atmospheric pressure attains a certain predetermined value and at which time the load on the aneroid 56 is reduced for a given datum setting relatively to what would normally be the load were the altitude droop mechanism not used. This so-called drooping starts when the differential on diaphragm 155 becomes sufficiently great to move it to the left until lever 151 brings roller 150 into contact with the adjacent end of rod 145. If now scoop pressure further decreases at a given datum setting, the diaphragm 155 will act through lever 151 and datum shaft 68 to lower the datum or manifold pressure setting, said diaphragm having its effective area proportioned to cause this resetting force to give the required droop.

Figure 10 plots manifold pressure against scoop pressure (which could also be altitude). Let it be assumed that curve 176 represents a position of the main power lever 45 which calls for a datum setting on aneroid 56 of fifty-four inches manifold pressure and which may correspond to take-off power settings or power settings short of war emergency settings. As long as lever 151 remains in a position such that roller 150 is out of contact with rod 145, the manifold pressure will be maintained constant with respect to scoop pressure, but when roller 150 contacts said rod, the force of the expanding aneroid bellows as determined by the datum spring is not only counteracted by manifold pressure but also by the differential across diaphragm 155, resulting in the break at the right extremity of curve 176. The scoop pressure at which this break occurs may be controlled by regulating the load on spring 163, which determines at what value of scoop pressure lever 151 will bring roller 150 in contact with rod 145. For the manifold pressure range below the break in curve 176, push rod 166 is in contact with piston 64 and said rod then acts through lever 169 to position sliding sleeve 162 and vary the load on spring 163. By suitably proportioning the lever ratio of lever 169 in accordance with the rate of spring 163, the load on diaphragm 155 may be made to vary with respect to a given sea level manifold pressure setting in a manner such that drooping will start at a predetermined differential between scoop pressure and manifold pressure. The dotted lines 177 represent sea level settings of the power control lever below take-off power; they carry out to where the "droop" line occurs in curve 176, from which point they will follow 176 out to maximum altitude.

For power settings above take-off, for example, the setting of sixty-five inches represented by the full line curve 178 and intermediate settings represented by the dotted lines 179, it becomes necessary to increase the load on spring 163 to compensate for or equal the increase in manifold pressure exerted on the left-hand side of diaphragm 155 above that for take-off power settings, in order that lever 151 will take a position similar to that taken at the lower setting at a given scoop pressure, or will act on rod 145 at the same scoop pressure and promote the "droop" at the predetermined point in the curve. This is done by push rod 167, which is adjusted to contact piston 64 when the latter reaches a position corresponding to take-off manifold pressure, here shown as fifty-four inches (absolute). For settings above this (curves 178 and 179), push rod 167 acts through lever 171 to move lever 169 independently, spring 168 taking the compression on push rod 166. Lever 171 is proportioned to produce the change in load on spring 163 necessary to start drooping at a fixed altitude for main power lever settings above take-off.

In actual construction, the special parts required for "altitude droop" are all mounted in a manner such that they can be removed or replaced as a unit. This is of advantage due to the fact that only certain types of installations require this special feature.

*Engine speed or R. P. M. control*

The propeller pitch governor setting, and hence engine speed, is controlled by angularly positioning a shaft 181, Figure 5, suitably journaled in the housing 40 and having secured thereon an arm 182 connected to the propeller pitch governor lever 20 by link 183. Also secured on shaft 181 is a segmental gear 184 in mesh with the toothed portion of a rack bar 185, the latter being provided with an extension 185' slidably supported in a bearing 186 which may be integral with a wall 187 formed as part of the housing 40. The toothed extremity of the rack bar preferably has bearing on a roller 188 supported by a stiff leaf spring or like resilient member to ensure full mesh of the rack and gear teeth and avoid backlash due to wear or play in the parts; and the extension 185' is preferably connected to the bar proper by a hinge pivot member 189 to compensate for any slight misalinement that may develop during use or result from inaccurate machining of co-acting parts.

A servo piston 190 is connected to the rack bar extension 185' and is slidingly mounted in a cylinder 191. Operating fluid (P-2) for piston 190 is conducted to cylinder 191 at opposite ends of piston 190 through ports or passages 192 and 193 controlled by a servo valve generally indicated at 194 and comprising a bushing 195, defining a valve cylinder 195' in which a valve member 196 is slidingly mounted and has a central land 197 and two end lands 198 and 199. The left end of the valve member 196 terminates in a stem portion which is encircled by a spring 200 normally urging the valve member to the right into abutting engagement with the adjacent end of a rod 196'. The bushing 195 is preferably made in sections to compensate for inaccurate machining, and likewise the valve member 196, being separate from the rod 196', also permits any slight misalinement.

A lever 201 (see also Figures 2 and 4) carries at its one end a cam follower 202 adapted to ride on the cam 47 which is rotatable with the lever 45''. The opposite extremity of lever 201 is fulcrumed or pivotally mounted at 203 on an upstanding lug which may be formed on the housing 40; said lever 201 having a bell crank extension or arm 204 to which is pivoted a servo lever 205.

When the pilot moves the main power control lever 45 to a selected power setting, he rotates the lever 45'' which carries the cam 47, and the latter, acting through the lever 201 and servo lever 205, positions the servo valve 196. If the cam 47 is rotated in a counterclockwise direction (datum increasing direction), the servo lever 205 is moved to the right, whereupon the valve 196 also moves to the right and the land 197 releases high pressure fluid (P-2) to the passage 192 and cylinder 191 to the left of the piston 190, while at the same time land 199 permits fluid to drain from the cylinder 191 on the right of said piston. This moves the piston to the right, thereby swinging the arm 182 to the left or in a direction to reduce the pitch of the propeller blades and increase engine speed for a given power lever setting. If the lever 45'' is moved in a clockwise direction, the servo lever 205 is moved to the left, thereby also moving servo valve 196 to the left, whereupon the land 197 admits high pressure fluid to the passage 193 and thence the cylinder 191 on the right side of the piston 190, while at the same time oil may drain from cylinder 191 on the left side of piston 190, the latter moving to the left and rotating lever 182 to the right or in a direction to increase the pitch of the propeller blades and decrease engine speed for a given power setting. Thus, for each position of the power control lever, a definite engine speed may be established according to a curve determined by cam 47.

Due to the high tolerance in the slope of calibration curves for different propeller governors, it may be necessary to make some adjustment at installation to obtain a stroke of the servo lever 205 such as will give the required power control angle vs. engine speed characeristic. Such adjustment should have no effect on the maximum speed setting but should have a proportional gradually increasing effect for engine speeds as the latter approach the minimum setting. An adjustment which meets the foregoing requirements consists of a pair of floating links or arms 206 and 208 pivotally connected at 207, the arm 208 being slidable in a retainer and guide 209 carried by the upper end of the servo lever 205. The upper end of the arm 206 is formed with a slot 210 extending at substantially a ninety degree angle to the said arm. A fixed but angularly adjustable member 211, note Figure 7, carries a pin 212 which engages in the slot 210, the said member 211 being formed on the inner end of a screw stub 211' which projects through a ring 213 on the upper end of a boss formed on the rack bar 185, said screw stub having a screw slot in the outer exposed end thereof. The contiguous surfaces of the disc 211 and ring 213 are provided with matched serrations, and a spring 213' pulls the disc 211 against ring 213 with sufficient force to prevent angular or rotational movement of the disc 211 under normal operating conditions but permitting angular adjustment manually by means of a screw driver or other suitable tool.

To adjust the stroke of the rack bar 185, the main control lever 45 may be set at maximum power position and the linkage and coacting parts which connect the said lever 45 to the governor control element 20 adjusted to give the required maximum engine R. P. M. for the power output at this position. The servo lever 205 should at this time be located so that relative movement between the servo lever and member 211 or the pin 212 carried thereby will not affect the position of said lever, or will simply result in relative up and down sliding movement between lever 205 and arm 208 without materially affecting the angular position of the servo lever, but for the minimum speed position of piston 190 (the extreme left-hand position), and for a corresponding position of the servo lever 205, relative movement between the servo lever and said pin varies the angular position of the servo lever and consequently varies the setting of the servo valve or the action of the servo lever with respect to the valve. For positions between minimum and maximum speeds, the effect of the adjustment is proportional, the angle defined by the arms 206 and 208 gradually decreasing as the rack bar moves to the right and attaining a minimum or becoming zero as the maximum R. P. M. position of the rack bar is reached.

In the event of failure of oil supply to the power control unit, it is desired to have the propeller governor automatically take up a position for a given predetermined engine speed at any setting of the pilot's control lever at or above that which would result in a power output sufficient to maintain such predetermined speed at minimum pitch of the propeller blades. For example, the governor may be automatically set for an engine speed of 2400 R. P. M. should the oil supply to the power control unit fail during flight or take-off or at any power setting sufficient to maintain the aircraft in flight.

With this in view, a cylinder 214 is disposed in alinement with cylinder 191 and a pair of coacting pistons 215 and 216 are mounted to slide therein on the extension 185' of the rack bar 185. The space between the pistons is vented to oil drain by means of ports 217 and 217' formed in the shaft which constitutes said extension. One or more compression springs 218 are disposed between the pistons and normally urge the latter apart. A channel 219 communicates high pressure fluid to the cylinder 214 at opposite ends of the piston; and as long as oil pressure remains normal, the pistons will be closed or remain in the position shown in Figure 2. The piston 216 is dished and carries a hub member 220 adapted to engage a stop shoulder 221 formed on the extension 185'.

Should oil pressure fail, the springs 218 will separate the pistons 215 and 216 and the latter will move in opposite directions until piston 215 reaches the limit of its travel to the left and the hub member 220 engages the shoulder 221 on the extension 185'. The thrust of piston 216 then acts through the rack bar 185 to position the shaft 181 in a manner such that the propeller pitch governor will be set in a position to give the desired pitch angle to the propeller blades. Assuming it is desired to reset the propeller blades to a pitch angle such as will result in an engine speed of 2400 R. P. M., at minimum cruise power output, then the shaft 181 would be positioned to set the pitch of the propeller blades through the control element 20 to give this speed at the minimum cruise position of the pilot's control lever 45. Should the propeller control governor 19 be of the hydraulic type receiving a supply of oil or hydraulic fluid through the power control unit, then the shaft 181 may be positioned to bring the propeller pitch control element to its low or high stop, whichever is desired. Ordinarily, however, the propeller pitch governor would be of the type wherein the motivating power is supplied from a source separate from the power control unit, so that the control element would be effective at any position within its range of adjustment.

*Selection of manifold pressure and engine speed for different take-off power settings*

Means are provided whereby different coordinated manifold pressures and engine speeds may be had for different take-off power settings without affecting the normal schedule of the remaining power settings. For example, an engine may have two take-off power settings, one for part throttle operation at a given manifold pressure and engine speed, and another for wide-open throttle operation at another manifold pressure and engine speed.

First considering the manifold pressure reset, a cylinder 225, note Figure 4, has at the right hand end thereof a hollow piston 226 adapted to contact the upper extremity of lever 77 under conditions to be described. A bolt 227 projects through the cylinder and piston and is secured to the latter at its right end, and at its left end the bolt is headed and engages a member 228 which is of open construction to permit oil under pressure to pass into the cylinder. A spring 229 abuts at its right end against the adjacent end of the cylinder and at its left end abuts said member. P-2 pressure is supplied to the cylinder 225 by way of passages 230, 230', the passage 230 having its inlet end controlled by valve 93. Communication between passages 230 and 230' is controlled by a valve generally indicated at 231 and comprising a ported cylinder in which is slidingly mounted a valve member 232 biased to closed position by a spring 233 and carrying at its right-hand end an adjustable contact screw 234 adapted to be engaged by a cam surfaced contact 235 formed on the gear segment 46. Since the gear 46 rotates counterclockwise when the power lever 45 is moved in a power-increasing direction, contact 235 will engage 234 at a predetermined power setting (which may be at part or substantially full setting of the main power control lever, depending upon adjustment of contact 234) and open valve 231, and since at this time the entrance to passage 230 is still open, P-2 pressure will be communicated from passage 230 to 230' and thence into cylinder 225 and hollow piston 226, forcing the latter to the right against the tension of return spring 229.

The lever 77 has an elongated slot 236 for pin 75 which extends at a predetermined angle, so that when piston 226 contacts lever 77, it can move the latter clockwise about the pivot pin 78 without affecting the position of lever 72' until the play in the slot is taken up; and this limited movement acts through link 80, servo lever 83 and servo valve 84 to relocate datum piston 64 slightly to the left, thereby reducing the datum and tending to close the throttle. This results in a manifold pressure setting lower than that which would normally be produced by cam 79. The return spring for servo valve 84 maintains lever 77 in its normal position when not contacted by piston 226.

Resetting of the propeller or engine speed governor may be obtained in the following manner:

The lever 201 is provided with an arm 237, see Figure 5, which extends beyond the fulcrum or pivot 203 and carries a roller 238 engaging a bracket or yoke 239' constituting an extension of a piston 239 mounted to slide in a cylinder 240 against the tension of a preloaded spring 241. An adjustable contact 242 determines the limit of downward travel of piston 239. Downward or clockwise (speed-increasing) movement of arm 237 is produced by a piston 243 slidingly mounted in a cylinder 244 and biased to inactive or return position by a spring 245, the said piston being provided with a bleed 246 to permit proper return movement when the operating pressure is relieved. Operating pressure is supplied to cylinder 244 by way of a passage 247 which branches off from passage 230', see Figure 4.

Let it be assumed that there is a requirement for two take-off settings for an engine, one for part throttle operation with an engine speed of, for example, 2900 R. P. M. and fifty-two inches Hg manifold pressure, and another for wide-open throttle operation with an engine speed of 2800 R. P. M. and fifty-four inches Hg manifold pressure, the change to these respective engine speeds and manifold pressures to take place only at take-off settings of the power control lever 45 with the remaining settings thereof conforming to the normal schedule as determined by the respective contours of cams 47 and 79. For part throttle operation, the screw 234 is adjusted so that when the lever 45'' is rotated counterclockwise to a point where the take-off setting is reached, contact 235 will engage 234 and valve 232 will be moved to the left, permitting oil under pressure (P-2) to pass from conduit or passage 230 to 230' and thence to the cylinder 225; this pressure being also simultaneously transmitted to the cylinder 244 through passage 247. Piston 226 now moves to the right and contacts lever 77, moving said lever clockwise until the clearance at 236 is taken up. This rotates lever 77 about the pivot 78 without disturbing the setting of the lever 72, while at the same time it acts through link 80 and servo lever 83 to move the servo valve 84 to the left, cutting down the pressure P-15 to the left of the piston 64 so that the latter will move slightly to the left and reset the manifold pressure datum. At the same time, the piston 243 moves downwardly in the cylinder 244 until its lower free end contacts the extension 239' of the piston 239, whereupon the arm 237 is moved downwardly, turning the lever 231 clockwise and increasing the engine speed the required amount, depending upon the position of the contact 242. Should the power lever 45 be now moved to a setting below take-off, contact 235 will move clear of 234 and valve 231 will close, cutting off high pressure oil to passages 230' and 247, and pistons 226 and 243 will move back to idle position, the operating fluid or oil passing through the bleed 246 into drain oil space within the housing 40.

Should the power lever 45 be moved to a setting beyond the take-off position, and which would normally happen only for temporary emergency power settings, the servo valve 93 would be moved far enough to the right to close off pressure P-2 from passage 230, thereby shutting off flow of oil to the valve 231.

*Water (anti-detonating fluid) injection override*

For engines equipped with a water injection system, it is permissible to use higher manifold pressures when water is being injected than under normal or "dry" operation. However, if higher manifold pressures are used with water injection, it is desirable to provide means whereby should the water supply become exhausted, the manifold pressure will be returned to normal or a safe value for dry operation.

The valve 231 is provided with a special land at its left end which controls communication of pressure (P-2) from passage 250 to 250', the latter leading to a water injection solenoid valve, generally indicated at 251, and which may be wired to a pressure switch, not shown, controlled by water pressure in a manner such that as long as water is being injected, the valve will be open, but should water pressure fail, the valve will close. For a valve operated in this manner, reference may be had to the copending application of Stanley B. Smith et al., Serial No. 533,296, filed April 29, 1944. Also, the valve may be operated manually, if desired. Said valve 251 is provided with a valve member 251' which when the valve is closed, shuts off communication between the passage 250' and a passage 252' leading to a valve cylinder 253 having a piston 254 at its left end adapted to engage the lever 77 when operating pressure is communicated to said cylinder and piston. The piston 254 is hollow and has connected thereto a bolt 255 having an open type washer 256 at its upper end, the said bolt being encircled by a return spring 257. This piston and cylinder unit is similar to the assembly comprising the cylinder 225 and piston 226 heretofore described.

When the power control lever 45 is set for a power requiring water injection (which is usually an emergency setting above take-off powers), the contact 235 will have been rotated to a point where it will open the valve 231, the exact point being determined by adjustment of 234, whereupon oil under pressure (P-2) will be communicated from passage 250 to 250'; and assuming that the solenoid valve 251 has been turned on, valve member 251' will have moved upwardly a sufficient distance to communicate passage 250' with passage 252. Oil under pressure will then flow to the cylinder 253 and piston 254 and move the latter to the left until it contacts lever 77, causing said lever to rotate counterclockwise and also rotate the lever 72 in a similar direction, raising cam follower 71 clear of cam 70 and at the same time acting through link 80 to move servo lever 53 to the right, increasing the pressure P-15 to the left of piston 64 and raising the manifold pressure datum to give the increased manifold pressure required for water injection. The lever 72 continues to rotate to the left or counterclockwise under the action of piston 254 until the cam follower 73 contacts the cam surface 138, which determines the particular value of manifold pressure for water injection. Should the water fail or become exhausted, valve 251 will close, or be returned to the position shown, cutting off oil from passage 252. The oil entrapped in the line or passage 252 will now bleed to drain and spring 257 will retract piston 254 whereupon the lever 72 will be moved clockwise under the influence of the spring 79 until the cam follower 71 again contacts the surface of cam 70, the manifold pressure then being restored to its normal value. It will be noted that valve 231 will not permit the take-off reset piston 226 and the water injection reset piston 254 to operate simultaneously.

*Provisions for expediting warm-up of the servo system*

To provide for warming the control up rapidly after the engine has been started, means are provided whereby a fairly large quantity of oil may be circulated through the unit during the warming-up period, such increased circulation being automatically returned to normal when the throttle reaches a predetermined open position, preferably its wide open position. This is accomplished by providing a bleed 260 from the passage 230 to the drain system (P-3) of the unit. Thus when the engine is warmed up at part throttle opening, the valve 93 which admits high pressure oil to the passage 230 is open, so that the latter passage becomes part of the circulatory system of the unit. However, when the throttle reaches a predetermined open position, valve 93 moves to the right in the manner heretofore described and closes the passage 230 from high pressure oil, and normal circulation is resumed.

*Figure 8*

Figure 8 illustrates an hydraulic coupling drive for a single stage engine to which the herein disclosed power control mechanism may be adapted. In this instance, the air intake conduit is indicated at 261 and is provided with a throttle 262 which may be controlled in the manner heretofore described in connection with Figures 1 to 5, inclusive. A supercharger is generally indicated at 263 and is provided with a drive shaft 264 which may be driven at varying speeds from an engine-driven shaft 265 acting through a system of gearing and hydraulic couplings 266, 267 and 268, which may be similar to the couplings 27 and 27' of Figure 1. The driving rotor of the low speed coupling 266 is driven at a given ratio of engine speed and the driven rotor of this coupling may be supplied with controlled hydraulic pressure to drive the supercharger up to the first critical altitude, or up to a point where substantially wide open throttle is attained. Up to this time couplings 267 and 268 will be devoid of operating pressure and as a consequence will simply idle. At altitudes above wide open throttle, hydraulic pressure is build up in the driven rotor of coupling 267 which then overdrives coupling 266 and the latter and coupling 288 idle. At altitudes above second critical, where the capacity of the supercharger is attained through the drive by way of coupling 267, or when the latter attains a minimum slip operating condition, hydraulic pressure is built up in the driven rotor of coupling 268, which coupling then begins to overdrive couplings 266 and 267. Obviously, two couplings only may be used, or one or more fluid couplings may be used with a mechanical clutch and the latter either manually or automatically disengaged when the drive is transferred therefrom to the fluid coupling.

*Alternate stability and damping system—Figure 9*

Figure 9 illustrates a damping system for the improved power control mechanism which may be used in place of that shown in Figure 2. In this instance only such parts of the control are shown as are necessary to an understanding of the damping system and these parts are illustrated schematically. The manifold pressure aneroid is indicated at 270 and the datum spring therefor at 271. The main servo valve 272, which corresponds to the valve 55 of Figure 2, is connected to the datum rod by means of a lever 273 pivoted or fulcrumed at 274, said lever projecting beyond the point where it is connected to the servo valve stem and at its lower free end terminating in a ball head which engages in an annularly groove or recess formed in a reset member 275 slidable on a piston rod 276 encircled by springs 277 and 278 and having inner and outer reset pistons 279 and 280 on the opposite ends thereof which are slidable in piston chambers 281 and 282. Chamber 281 is vented to a pipe or conduit 283 which in turn is vented to drain pressure through a bleed 284; while chamber 282 is vented to drain pressure.

The pipe or conduit 283 communicates at its lower end with a piston chamber 286 having a damping piston 287 mounted to slide therein and connected to the one end of a piston rod 288, the opposite end of said rod being connected to a back pressure piston 289 slidable in a piston chamber which is of greater area than the chamber 286 for a purpose to be directed. The pistons 287 and 289 move in unison, movement to the left being resisted by spring 292 and oil or hydraulic fluid which normally fills the chamber 286 and may escape therefrom to chamber 281 and through bleed 284. The chamber 290 communicates with a conduit 295 which conducts hydraulic fluid from an hydraulic coupling control valve generally indicated at 296 and which corresponds to the coupling valve 102 of Figure 2. Other parts which are shown in diagram and have their counterparts in Figure 2 include the throttle-operating piston 297, which corresponds to pistons 51, 51' of Figure 2, and the cut-in valve 298 which corresponds to valves 92 and 93 of Figure 2. There is also shown an hydraulic coupling 299 which drives a supercharger 300, the latter being supplied with air through an air intake passage or conduit 301 controlled by a throttle 302. A lever 303 connects piston 297 with the throttle and has a contact 304 on the lower end thereof adapted to contact cut-in valve 298 when the throttle attains a predetermined open position.

In operation, the cut-in valve 298 does not open until the throttle 302 attains a predetermined open position, depending upon the location of the contact 304 with respect to the throttle 302 and the piston 297. As long as the manifold pressure is being maintained within a range controlled by the throttle and valve 298 is closed, pressure in conduit 295 and piston chamber 290 will be at a minimum and the back pressure piston 289 will be substantially in the position shown. During this range of control, the servo valve 272 will be damped by the pistons 279 and 280, which if the force exerted on spring 277 is sufficient to cause movement to the left, force oil or fluid through the bleed 284, or if such movement is to the right, force oil through bleed 285. When the throttle attains a substantially wide open position and the contact 284 opens the valve 298, oil under pressure will be metered by coupling valve 296 through the conduit 295 to the fluid coupling 299, assuming the manifold pressure to be maintained requires the increased supercharger speed.

Assuming the datum spring 271 has been set to maintain a given manifold pressure, and there is a drop from such given value due to a decrease in air density; the aneroid 270 will expand and turn the lever 273 clockwise, and oil pressure or hydraulic fluid will build up in the coupling 299, whereupon the speed of the supercharger will increase and start to raise the manifold pressure to the value set by said spring. As the manifold pressure rises, the pressure in piston chamber 290 also increases, tending to move the piston 289 and the damping piston 287 to the left, which in turn increases the pressure in chamber 281 and tends to turn the lever 273 counterclockwise and vary the datum of bellows 270. Thus, as the manifold pressure approaches the value determined by the datum spring 271, the datum is temporarily changed to meet the manifold pressure. As the manifold pressure then starts to overshoot this false setting brought about by the feedback pressure developed in piston chamber 281, the datum will return to the correct setting as determined by the datum spring 271 at what might otherwise be the peak of an overshoot curve.

It will be understood that no attempt has been made herein to specifically describe all of the functions and advantages of which the improved control unit is capable, and also that certain changes in construction, design and arrangement of the parts may be made without departing from the scope of the invention as defined by the appended claims.

We claim:

1. For use with an internal combustion engine having a throttle-controlled induction passage provided with a supercharging system including a supercharger and a hydraulic coupling for varying the ratio of engine-to-supercharger speed, power control mechanism including a manually operable power control member, means for regulating hydraulic flow to said coupling including a fluid metering valve, hydraulic motor means including an hydraulic piston arranged to operate the throttle and another hydraulic piston arranged to operate said valve, a servo valve controlling admission of operating pressures to said pistons, variable datum means including a device responsive to changes in manifold pressure and an element adjustable by said power control member to set the datum for said device, a member movable with said device, an operating connection between said latter member and said servo valve whereby the throttle is automatically positioned to maintain the selected manifold pressure up to charging capacity for substantially wide-open throttle, and a valve in series with said servo valve adapted to be opened when the throttle approaches such predetermined position and pass operating fluid to said piston for operating the metering valve to produce a supercharger speed such as will maintain the selected manifold pressure.

2. For use with an internal combustion engine having a throttle controlled induction passage provided with a supercharging system including a supercharger, a hydraulic coupling for varying the ratio of engine-to-supercharger speed, power control mechanism including a manually operable power control member, servo motor means including a hydraulic piston arranged to operate the throttle, means for regulating fluid flow to said hydraulic coupling comprising a metering valve and servo motor means including a hydraulic piston for operating the valve, said hydraulic pistons being arranged in series flow relationship, variable datum means including an element responsive to changes in manifold pressure and a datum spring adjustable by said power control member to set the datum for said element, a member connected to said element for movement in relation to changes in manifold pressure and arranged to actuate said servo valve in a manner such as to pass operating fluid first to said throttle operating piston and upon a decrease in manifold pressure at a given datum setting to said valve-operating piston, and whereby a selected manifold pressure is maintained by automatic positioning the throttle until charging capacity is reached for approximately wide-open throttle whereupon said metering valve is regulated to meter hydraulic fluid to said couplings, and valve means functioning to cut off flow of operating fluid to said valve-operating piston while the selected manifold pressure is being maintained by the throttle but being rendered effective when the throttle approaches wide-open position to communicate operating pressure to said piston for operating the metering valve.

3. For use with an internal combustion engine having a throttle-controlled induction passage provided with a supercharging system including an hydraulic coupling for varying the ratio of engine-to-supercharger speed, power control mechanism including a manually-operable power control member operatively connected to the throttle, a fluid-actuated power piston also operatively connected to the throttle, differential mechanism arranged to permit actuation of the throttle by said piston independently of said power control member, means for regulating the effective pressure in said fluid coupling including a metering valve and a fluid-actuated piston for positioning said valve, variable datum means including a device responsive to changes in manifold pressure and a datum spring adjustable by said power control member, a valve-actuating member connected to said device for movement in relation to changes in manifold pressure, a flow channel for communicating operating pressure to said throttle-operating piston and said valve-positioning piston, a valve controlling passage of operating fluid from said throttle-operating piston to said valve operating piston, a servo valve operable by said valve-actuating member for controlling passage of fluid under pressure to said second-named valve, and means becoming effective upon the throttle attaining an approximately wide-open position to open said second-named valve and pass operating pressure to said valve-positioning piston, the arrangement being such that said throttle-operating piston acts to position the throttle for maintaining a selected manifold pressure until the throttle attains approximately wide-open position where- upon the metering valve is regulated to meter fluid to said coupling and increase the speed of the supercharger to maintain the selected charging pressure.

4. For use with an internal combustion engine having a throttle-controlled induction passage provided with a supercharging system including a hydraulic coupling for varying the ratio of engine-to-supercharger speed, power control mechanism including a manually-operable power control member, a fluid-actuated power piston operatively connected to the throttle, means for regulating the effective pressure in said coupling including an hydraulic flow metering valve and a fluid-actuated piston for positioning said valve, an hydraulic flow-controlling system including a flow channel for serving said pistons and a servo valve controlling flow of fluid in said channel, a valve controlling flow of fluid from said channel to said throttle-operating piston, another valve controlling flow of operating fluid through said channel from said throttle-operating piston to said metering valve piston, means for controlling said last-named two valves in a manner such that when the throttle attains an approximately wide-open position fluid pressure is exerted on said throttle operating piston in a throttle opening direction and as the throttle approaches wide-open position operating fluid is passed to said metering valve piston, and means responsive to changes in manifold pressure for operating said servo valve.

5. For use with an internal combustion engine having a throttle-controlled induction passage provided with a supercharging system including an hydraulic coupling for varying the ratio of engine-to-supercharger speed, power control mechanism including a manually operable power control member, a throttle lever, a fluid actuated power piston, differential mechanism operatively interconnecting said power control member and said piston with said lever whereby said piston may operate the throttle independently of said power control lever, means for regulating the hydraulic flow to said coupling including an hydraulic flow metering valve and an hydraulic piston for positioning said valve, an hydraulic flow-controlling system including a flow channel for serving the throttle-actuating piston and said valve-actuating piston and a servo valve controlling flow of fluid in said channel, a valve controlling flow of fluid from said channel to said throttle-operating piston and another valve associated with said last-named valve for controlling the flow of operating fluid through said channel from said throttle-operating piston to said metering valve piston, said two last-named valves having valve-operating members arranged in spaced relation for operation in sequence with a lost motion connection therebetween, said differential mechanism including a member movable in relation to the throttle, a contact carried by said latter member, and a valve-actuating lever interposed between said valve operating members and arranged to be actuated by said contact when the throttle approaches wide-open position and pass fluid under pressure to said metering valve piston and adjust fluid flow to the throttle-actuating piston.

6. For use with an internal combustion engine having an induction passage provided with a supercharger and a fluid coupling for transmitting a driving force to said supercharger at variable ratios of engine-to-supercharger speed, power control mechanism including a manually operable power control member, means for regulating the flow of hydraulic fluid to said coupling including a metering valve and a series of metering orifices controlled by said valve in sequential order as the valve moves towards open and closed position, hydraulic means for operating said valve including a fluid-actuated piston, a servo valve controlling flow of operating fluid to said piston, variable datum means including a capsule responsive to changes in manifold pressure, a member connected to said capsule for movement therewith, and an operating connection between said latter member and said servo valve.

7. For use with an internal combustion engine having an intake manifold provided with a supercharger and an hydraulic coupling for transmitting a driving force to said supercharger at variable ratios of engine-to-supercharger speed, a power control device provided with means for metering fluid to said coupling including a first flow passage for unmetered fluid under pressure and a second flow passage for metered fluid forming a continuation of said first passage, a wall forming a partition between said fluid passages and provided with a plurality of metering orifices arranged in series relation, said wall defining a valve chamber, a metering valve mounted in said chamber, and means for actuating said valve in a manner such that the said metering orifices are opened and closed in sequence in relation to changes in pressure in said intake manifold.

8. A power control unit adapted for use with an aircraft internal combustion engine for maintaining a selected manifold pressure substantially constant at varying altitudes including a manually-operable power control member, a variable datum assembly comprising a device responsive to changes in manifold pressure, a datum spring operatively associated with said device, a fluid actuated power piston for tensioning said spring, a servo valve controlling flow of operating fluid to said piston, and means operatively connecting said power control member to said servo valve.

9. A power control unit for maintaining a selected value of manifold pressure in an aircraft internal combustion engine substantially constant at varying altitudes including a manually operable power control member, a device such as an aneroid responsive to changes in manifold pressure, a datum spring operatively connected to said aneroid, an hydraulic piston connected to said spring for tensioning the latter, a servo valve controlling flow of operating fluid to said piston, linkage operatively connecting said power control member to said servo valve, and follow-up means operatively interconnecting said piston linkage and said servo valve for maintaining said piston at a given position as determined by the setting of the said power control member.

10. For use with an internal combustion engine having a throttle-controlled induction passage, power control mechanism including a manually operable power control member, an hydraulic power member for automatically actuating the throttle, a servo valve for controlling flow of operating fluid to said power member, variable datum means including an element responsive to changes in manifold pressure for controlling said servo valve, said power control member being operative to set the datum for said variable datum means, differential mechanism providing for operation of the throttle by said hydraulic power member independently of said power control member and arranged in a manner such that when said hydraulic power member is located in the region of its throttle-closing position the throttle is operable manually by said power control member, means adapted to move said hydraulic power member to its throttle-closing position when operating pressure is relieved therefrom, and manually operable means for cutting off the flow of operating fluid to said hydraulic power member and whereby transfer from automatic to manual control of the throttle may be had at the will of a pilot or operator.

11. For use with an internal combustion engine having a throttle-controlled induction passage, power control mechanism including a manually operable power control member, an hydraulic power piston for automatically actuating the throttle, a servo valve for controlling flow of operating fluid to said piston, variable datum means including an element responsive to changes in manifold pressure for controlling said servo valve, said power control member being operative to set the datum for said variable datum means, differential mechanism providing for operation of the throttle by said hydraulic piston independently of said power control member and arranged in a manner such that when the piston is located in the region of its throttle-closing position the throttle is operable manually by said power control member, a spring adapted to move said piston to its throttle-closing position when operating fluid is relieved from said piston, and a valve operable exteriorly of the power control mechanism for cutting off the flow of operating fluid to said piston and whereby transfer from automatic to manual control of the throttle may be had at the will of a pilot or operator.

12. In power control mechanism for an internal combustion engine having a throttle-controlled induction passage, power means for operating the throttle, variable datum means including a device responsive to changes in manifold pressure, an operating connection between said variable datum means and said power means for automatically operating the latter, manual means for setting the datum of said device, means whereby when the power means is de-energized the throttle is moved toward closed position and a direct mechanical connection is established between said manual means and the throttle, and means operable at the will of a pilot or operator for de-energizing said power means.

13. For use with an engine having an intake manifold and an engine speed governor, control mechanism including variable datum means for maintaining a selected manifold pressure, a manually operable power control member, means providing an operating connection between said power control member and said variable datum means and also between said latter member and said governor including a datum cam and an engine speed cam and hydraulic motor means to which hydraulic flow is controlled by servo valves in turn controlled by said cams and whereby said power control member may be adjusted to obtain a selected manifold pressure and coordinated engine speed, and means automatically becoming effective at a given power setting of said power control member and in response to movement of said member to such given setting for varying the datum and speed settings from the values normally obtained by said cams.

14. For use with an engine provided with an intake manifold and an engine speed governor and an element for adjusting the setting of said governor, control mechanism comprising variable datum means including a device responsive to changes in manifold pressure, a manually operable power control member, means connecting said power control member with said variable datum means including a datum cam, means connecting said power control member with said governor control element including a speed cam for coordinating engine speed with manifold pressure, means whereby when said power control member is moved to a predetermined position, as for example, to take-off power settings, the datum for engine manifold pressure and engine speed is varied from the normal values determined by said cams, and automatically operating means rendering said datum varying means ineffective at power settings above or below such predetermined position.

15. For use with an engine having a throttle-controlled induction passage and an engine speed governor, control mechanism comprising a manually operable power control member, variable datum means including an element responsive to changes in manifold pressure, means providing an operative connection between said power control member and said variable datum means including a datum cam, an engine speed cam movable in relation to said power control member, means providing an operative connection between said datum cam and said variable datum means and also between said speed cam and said governor including mechanical linkage movable to positions such as will adjust the manifold pressure and engine speed to values other than those normally set by said cams, fluid pressure means for actuating said linkage independently of said cams, means becoming effective to pass operating fluid to said fluid pressure means when said power control member is moved to a predetermined power position, and means for rendering said fluid pressure means inoperative when said power control member is moved to a position above or below such predetermined power position.

16. For use with an engine having a throttle-controlled induction passage and an engine speed governor, control mechanism comprising a manually operable power control member, variable datum means including an element responsive to changes in manifold pressure, a manifold pressure datum cam and an engine speed cam movable in relation to movement of said power control member, means providing an operative connection between said datum cam and said variable datum means and other means providing an operative connection between said speed cam and said governor, fluid pressure means becoming effective when said power control member is moved to a predetermined power position to adjust said connecting means independently of said cams and adjust the manifold pressure datum and the governor setting to values other than those normally set by said cams, and means rendering said fluid pressure means ineffective to maintain such abnormal values when said power control member is moved to a position above or below such predetermined power setting.

17. For use with an internal combustion engine having an engine speed governor, power control mechanism including a manually operable power control member, an engine speed cam movable in relation to movement of said member, a lever controlled by said cam and having an operative connection with said governor in a manner such that movement of the lever produces a definite speed setting of said governor, a fluid-actuated piston disposed to act on said lever independently of said cam, and valve means arranged to pass hydraulic fluid to said piston when the power control member is moved to a predetermined power position, said valve means operating to close off such flow when said member is moved to a power setting above or below such predetermined setting.

18. Power control mechanism as claimed in claim 17, wherein means are provided for adjusting the effective travel of said lever in response to the force exerted thereon by said piston.

19. For use with an internal combustion engine having an intake manifold, power control mechanism including a manually operable power control member, variable datum means comprising a device responsive to changes in manifold pressure, a datum cam movable in relation to movement of said member, means providing an operative connection between said cam and device including a lever which for a given position of said power control member produces a definite manifold pressure datum, a fluid-actuated piston disposed to act on said lever independently of said cam, and valve means arranged to pass hydraulic fluid to said piston when the power control member is moved to a predetermined power position, said valve means operating to close off such flow when said member is moved to a power setting above or below such predetermined setting.

20. For use with an internal combustion engine having a throttle-controlled induction passage and an engine speed governor, power control mechanism including a manually operable power control member, variable datum means including a device responsive to manifold pressure, a datum cam and an engine speed cam movable in relation to movement of said member, means providing an operating connection between said datum cam and said device and between said speed cam and governor, a pair of fluid actuated pistons arranged to modify the action of said latter means and provide selected manifold pressures and engine speeds independently of said cams at predetermined degrees of throttle openings, as at part and full throttle openings for different take-off settings, a valve arranged to open when the power control member is advanced to a predetermined position in a power-increasing direction and pass operating fluid to said pistons and to close when said member is moved to a position below such predetermined position and cut off operating fluid to said pistons, and another valve in series with said first-named valve arranged to cut off flow of operating fluid to said pistons should the throttle be moved beyond a predetermined open position.

21. For use with an engine having a variable pitch propeller and means such as a governor having a control element movable to different positions to vary the pitch of the propeller blades and to thereby vary the speed of the engine at a given power output, power control mechanism including a manually operable power control member, means including an hydraulic piston operatively connecting said member to said element, a servo valve responsive to movement of said member for regulating the flow of hydraulic fluid to said piston, said piston being comprised of separable parts biased toward separated position, and means holding said parts closed as long as hydraulic operating fluid is available for said piston, the parts of the piston when separated automatically operating to move the control element to a position such as will give a predetermined engine speed setting to the propeller governor.

22. For use with an engine having a variable pitch propeller and means such as a governor having a control element movable to different positions to vary the pitch of the propeller blades and thereby vary the speed of the engine at a given power output, power control mechanism including a manually operable power control member, means including an hydraulic piston operatively connecting said member to said element, a servo valve responsive to movement of said member for regulating flow of hydraulic fluid to said piston in a manner such that a given position of said member will produce a given R. P. M. of said engine, said piston being comprised of separable parts spring-urged towards open position, means whereby fluid under pressure is conducted to opposite ends of said piston for holding said parts in closed position, and means becoming effective through separation of said parts to move said control element to a predetermined engine speed setting.

23. For use with an engine having a governor provided with a control element movable to different positions to vary the speed of the engine at a given power output, power control mechanism including a manually operable power control member, an hydraulic motor operatively connected to said element for moving the same, a servo valve controlling hydraulic flow to said motor, linkage mechanism operatively connecting said power control member to said servo valve including a servo lever for actuating the valve, and means for adjusting the stroke of the servo lever in a manner such that the adjustment has maximum effect on the stroke at a minimum engine speed position of the servo lever and has a gradually decreasing effect as the servo lever approaches maximum speed position.

24. For use with an engine having a governor provided with a control element movable to different positions to vary the speed of the engine at a given power output, power control mechanism including a manually operable power control member, an hydraulic piston operatively connected to said element for moving the same, a servo valve controlling hydraulic flow to said piston, linkage mechanism operatively connecting said power control member to said servo valve including a servo lever for actuating the valve, and means for adjusting the stroke of the servo lever to produce a stroke of the piston which will correlate the various settings of the power control member with the propeller pitch calibration curve comprising an element movable with said piston and a pair of angularly-related members one of which has a slidable connection with said lever and the other of which has a slidable connection with said latter element, the arrangement being such that the angle defined by said members is greatest at the minimum speed position of said lever and piston and gradually decreases as said lever and piston approach maximum speed position.

25. Power control mechanism as claimed in claim 24 wherein said element movable with the piston is adjustable with respect to said angularly-related members.

26. In a power control unit for an internal combustion engine having an intake manifold, variable datum means including an element responsive to changes in manifold pressure, a manually operable power control member, means including a datum cam operatively connecting said power control member to said element whereby a given setting of said member produces a given manifold pressure datum, and means for overriding said cam to provide a cruise datum setting independently of said power control member comprising a manually operable cruise override lever, linkage interconnecting said lever with said cam and said variable datum means whereby the datum may be set by said lever independently of the cam, and means arranged to automatically return the datum control to said datum cam irrespective of the position of said lever when the power control member is adjusted to a position calling for a manifold pressure above that set by said lever or below the minimum cruise manifold pressure.

27. In a power control device for use with an internal combustion engine having an intake manifold, variable datum means including an element responsive to changes in manifold pressure, a manually operable power control member, means including a datum cam operatively connecting said member to said element whereby a given position of said member results in a given manifold pressure datum, a manually operable cruise override lever for providing a cruise position above that normally set by said datum cam, and linkage mechanism connecting said lever to said cam and also to said variable datum means including a lever, spaced cam followers movable in unison and one of which is adapted to contact the datum cam and set the datum for normal cruise position and is raised clear of said cam when said lever is moved to cruise override position, and cam surfaces movable with said datum cam and contoured in a manner such that when the datum cam is rotated to a position calling for a manifold pressure above that set by the cruise override lever or below the minimum cruise manifold pressure the other cam follower is engaged and moves the datum cam follower back on the datum cam so that the control will automatically revert to the main power control member.

28. In a power control device for use with an internal combustion engine having a throttle-controlled induction passage terminating in an intake manifold, variable datum means including an element responsive to changes in manifold pressure, a manually operable power control member, means operatively connecting said member to said device including a datum cam rotatable by said member, an hydraulic motor for operating the throttle, means responsive to movement of said element for controlling hydraulic flow to said motor, means whereby when hydraulic fluid is cut off from said motor the latter moves to a position permitting direct manual control of said throttle by said power control member, a valve for cutting off flow of hydraulic fluid to said motor, a manually operable cruise override lever and means interconnecting said lever with said datum cam and said variable datum means whereby a manifold pressure datum setting may be obtained by said lever independently of said power control lever, and means operatively connecting said lever to said valve in a manner such that when the lever is moved to a position counter to that for over-riding said cam, it closes said valve.

29. In a power control device for use with an internal combustion engine having an intake manifold, variable datum means including an element responsive to changes in manifold pressure and means for setting the datum of said element, means controlled by said variable datum means for maintaining the manifold pressure at the set value, a manually operable power control member, means including a datum cam controlled by said member, means for overriding said datum cam to increase the manifold pressure setting for injecting anti-detonating fluid including an hydraulic piston, a valve controlling flow of hydraulic fluid to said piston and adapted to be turned on when anti-detonating fluid is to be injected, and another valve controlling flow of hydraulic fluid to said first-named valve and adapted to be opened when the power control member is moved to a predetermined power position, said latter valve being biased towards closed position so that when the power control member is retracted from the anti-detonating injection position hydraulic flow is automatically cut off from said piston.

30. For use with an internal combustion engine, means for regulating the charging or manifold pressure, variable datum means including a capsule responsive to changes in manifold pressure, means for adjusting the datum of the capsule, hydraulic means for controlling said regulating means, a servo valve controlling flow to said hydraulic means, means operatively connecting the servo valve to said variable datum means to be regulated thereby, and means for momentarily interposing an opposing force to movement of said servo valve in a direction tending to change the charging pressure in a direction opposite to its actual direction of change and becoming decreasingly effective as the charging pressure approaches the value set by said adjusting means.

31. For use with an internal combustion engine, movable means for regulating the charging or manifold pressure, variable datum means including a capsule responsive to changes in manifold pressure, means for adjusting the datum of the capsule, hydraulic means for controlling said regulating means, a servo valve controlling flow to said hydraulic means, resilient mechanical means tending to maintain said servo valve in an equilibrium position and resisting movement of said valve from such position, and fluid pressure means for imposing a force on said servo valve in proportion to the rate of movement of said regulating means and tending to alter the datum set by said adjusting means in a direction tending to arrest and reverse movement of said regulating means as the manifold pressure approaches the adjusted datum value.

32. In control mechanism for regulating the charging or manifold pressure of a supercharged internal combustion engine provided with a throttle-controlled induction passage, an hydraulic motor arranged to actuate the throttle, a servo valve controlling hydraulic flow to said motor, variable datum means including a device responsive to changes in engine charging pressure and means for adjusting the datum of said device, said servo valve being operatively connected to said variable datum means, resilient mechanical means tending to maintain said valve in an equilibrium position and resisting movement of said valve from such position, and means for preventing overshooting of the manifold pressure when the latter increases in response to opening movement of the throttle comprising hydraulic means acting through said valve to interpose an opposing force to movement of said device in the event of a rapid change in charging pressure.

33. In control mechanism for regulating the charging or manifold pressure of an engine provided with a supercharger and a hydraulic system for driving the supercharger at varying speeds, variable datum means including a device responsive to changes in manifold pressure and means for adjusting the datum of said device, and means responsive to a change in pressure in the hydraulic system for momentarily opposing the change in manifold pressure as the latter approaches the value set by said variable datum means.

34. For use with an engine provided with a supercharger and one or more fluid couplings for driving the supercharger at varying speeds, power control mechanism including variable datum means, means for adjusting the datum of said variable datum means, a servo valve controlling hydraulic flow to said couplings, said servo valve being operatively connected to said variable datum means, a fluid pressure actuated device arranged to momentarily interpose a force on said servo valve, and a conduit communicating said fluid pressure device with the hydraulic system at a point in the latter such that the back pressure generated by said device becomes a function of the rate of change of the operating pressure generated in said couplings.

35. For use with an internal combustion engine provided with a supercharger and one or more hydraulic couplings for driving the supercharger at varying speeds, power control mechanism including a metering valve for metering hydraulic fluid to said couplings, a servo valve controlling hydraulic flow to said metering valve, variable datum means including a device responsive to changes in manifold pressure and means for adjusting the datum of said device, said servo valve being operatively connected to said variable datum means to be controlled thereby, means tending to maintain said servo valve in an equilibrium position, fluid pressure means arranged to affect movement of said servo valve, and a conduit communicating said fluid pressure means with the hydraulic system beyond said coupling valve.

36. Control mechanism for regulating the charging or manifold pressure of an internal combustion engine comprising: variable datum means including a device responsive to changes in manifold pressure and means for adjusting the datum of said device, a substantially sealed chamber in which said device is mounted, means providing a manifold pressure chamber adjacent said first-named chamber, a flexible wall interposed between said chambers, changes in manifold pressure applying a load to said device through said wall in direct relation to such changes, and a bleed communicating said manifold pressure chamber with said first-named chamber so that when the manifold pressure changes relatively rapidly, the pressure on one side of said flexible wall will lag behind the pressure on the opposite side thereof and such lag will act as a force tending to momentarily change the datum setting of said device.

37. For use with an internal combustion engine having a throttle-controlled induction passage, power control mechanism including hydraulic means for actuating the throttle, variable datum means controlled by said variable datum means for regulating flow of fluid under pressure to said throttle operating means, a drain passage for draining fluid from said throttle operating means, a valve controlling said latter passage, and means for controlling said valve in relation to the throttle in a manner such that said drain passage is open for increasing the circulation of hydraulic fluid during the warming-up period of engine operation and until the throttle attains a predetermined open position.

38. In power control mechanism for a supercharged aircraft internal combustion engine having an air-intake passage terminating in an intake manifold, variable datum means including a device responsive to changes in manifold pressure, means for adjusting the datum of said device, means controlled by said variable datum means for maintaining the manifold pressure at a value set by said adjusting means, and means becoming effective at a predetermined differential between manifold pressure and air intake pressure for causing the manifold pressure to "droop" or follow a value lower than that set by the datum as such differential increases to avoid excessive heating of the charge and possible detonation due to operation under high supercharger rise conditions.

39. In power control mechanism for a supercharged aircraft internal combustion engine having an air-intake passage terminating in an intake manifold, variable datum means including a device responsive to changes in manifold pressure, means for adjusting the datum of said device, means controlled by said variable datum means for maintaining the manifold pressure at a value set by said adjusting means at varying altitudes, a flexible wall such as a diaphragm arranged to be responsive to the differential between air intake pressure and manifold pressure, and means movable in relation to said device and having an operative connection with said diaphragm whereby when said differential attains a predetermined value the datum is caused to follow a value below that set by said adjusting means and thereby cause the manifold pressure to "droop" as such differential increases to avoid excessive heating of the charge and possible detonation due to operation under high supercharger rise conditions.

40. In power control mechanism for a supercharged aircraft internal combustion engine having an air-intake passage terminating in an intake manifold, variable datum means including a device responsive to changes in manifold pressure, means for adjusting the datum of said device, means controlled by said variable datum means for maintaining the manifold pressure at a value set by said adjusting means at varying altitudes, a flexible wall such as a diaphragm arranged to be responsive to the differential between intake pressure and manifold pressure, a member movable in relation to said device and adapted to be opposed by diaphragm differential pressure when the said differential attains a predetermined value, to thereby cause the manifold pressure to "droop" as the differential between intake and manifold pressure increases.

41. In power control mechanism for a supercharged aircraft internal combustion engine having an air-intake passage terminating in an intake manifold, variable datum means including a capsule adapted to expand and contract in response to changes in manifold pressure and means for adjusting the datum of said capsule, means controlled by said variable datum means for maintaining the manifold pressure at a value set by said adjusting means at varying altitudes, a flexible wall such as a diaphragm responsive to changes in the differential between air intake pressure and manifold pressure, a contact member connected to said diaphragm and another contact member movable in relation to expansion and contraction of said capsule and adapted to engage said first-named contact member when the diaphragm attains a predetermined degree of travel so that movement of the capsule is modified by the differential across said diaphragm, to thereby cause the manifold pressure to "droop" as the differential between intake and manifold pressure increases.

42. In power control mechanism for a supercharged aircraft internal combustion engine having an air-intake passage terminating in an intake manifold, variable datum means including a capsule adapted to expand and contract in response to changes in manifold pressure, a manual power control member for adjusting the datum of said capsule, means controlled by said variable datum means for maintaining the manifold pressure at a value set by said member, a flexible wall such as a diaphragm responsive to changes in the differential between air intake pressure and manifold pressure, a contact member connected to said diaphragm and another contact member movable in relation to expansion and contraction of said capsule and adapted to engage said first-named contact member when the diaphragm attains a predetermined degree of travel so that further capsule movement is modified by the differential across said diaphragm, said predetermined degree of travel being equivalent to a given altitude as determined by the setting of said power control member, to thereby cause the manifold pressure to "droop" as the differential between intake and manifold pressure increases.

43. In power control mechanism for a supercharged aircraft internal combustion engine having an air-intake passage terminating in an intake manifold, variable datum means including a capsule adapted to expand and contract in response to changes in manifold pressure and a datum spring, a manual power control member which when set at different positions varies the tension of said spring, means controlled by said variable datum means for maintaining the manifold pressure at a value set by said member, a datum rod connected to said capsule for movement therewith, a diaphragm arranged to be responsive to changes in the differential between air intake pressure and manifold pressure, a member connected to said diaphragm and adapted to be contacted by said datum rod when the capsule attains a predetermined degree of expansion so that further expansion movement is modified by the differential across said diaphragm, a second spring arranged to modify the differential across said diaphragm, and means becoming effective at a given altitude for varying the load on said second-named spring as a function of the datum setting and cause the manifold pressure to start "drooping" should there be a further gain in altitude.

44. Power control mechanism as claimed in claim 43, wherein said means for varying the load on said second spring includes a plurality of contact members arranged to become effective in sequence as altitude increases.

45. For use with an internal combustion engine having a throttle controlled induction passage provided with a supercharging system including a supercharger and a fluid coupling for varying the ratio of engine-to-supercharger speed, power control mechanism including a selectively operable power control member, variable datum means including a manifold pressure aneroid having an operative connection with said member and the throttle for automatically positioning the throttle to maintain a selected charge pressure at varying air densities, a metering valve for metering fluid to said coupling, and means responsive to changes in throttle position and becoming operative at nearly wide open throttle to move said metering valve to metering position.

46. For use with an internal combustion engine having a throttle controlled induction passage provided with a supercharging system including a supercharger and a fluid coupling for varying the ratio of engine-to-supercharger speed, power control mechanism including a selectively operable power control member, variable datum means including a manifold pressure aneroid having an operative connection with said member and the throttle for automatically positioning the throttle to maintain a selected charge pressure at varying air densities, a metering valve for metering fluid to said coupling, hydraulic means for operating said valve, and a servo or pilot valve responsive to changes in throttle position and arranged to open at nearly wide-open throttle and pass fluid to said hydraulic means.

47. For use with an internal combustion engine having a throttle controlled induction passage provided with a supercharging system including a supercharger and a fluid coupling for varying the ratio of engine-to-supercharger speed, power control mechanism including a hydraulic power or servo motor for operating the throttle, a servo or pilot valve for said motor, a selectively operable power control member, variable datum means including a manifold pressure aneroid having an operative connection with said member and said servo valve for automatically positioning the throttle to maintain a selected charge pressure at varying air densities, a metering valve for metering fluid to said coupling, hydraulic means for operating said valve, and another servo or pilot valve for said hydraulic means, said latter valve being coordinated with said first-named servo valve and arranged to open at nearly wide-open throttle and pass fluid to said hydraulic means.

48. For use with an internal combustion engine having a throttle controlled induction passage provided with a supercharging system including a supercharger and a fluid coupling for varying the ratio of engine-to-supercharger speed, power control mechanism including a hydraulic power or servo motor for operating the throttle, a servo or pilot valve for said motor, a selectively operable power control member, variable datum means including a manifold pressure aneroid having an operative connection with said member and said servo valve for automatically positioning the throttle to maintain a selected charge pressure at varying air densities, a metering valve for metering fluid to said coupling, hydraulic means for operating said latter valve, and another servo or pilot valve for said hydraulic means, said latter valve being operative as a function of throttle position and being adapted to open at nearly wide open throttle and operate said hydraulic means.

49. Pressure control apparatus for supercharged internal combustion engines comprising, in combination, a throttle valve controller having means for selecting a pressure to be maintained and means under joint control by said pressure selecting means and by engine intake pressure for so positioning the throttle valve as to maintain a selected pressure, apparatus for adjusting the speed of a supercharger, means rendered effective to cause the speed adjusting means to increase the speed of the supercharger as the throttle valve controller operates to increase throttle opening beyond a certain extent in order to satisfy a demand for a selected intake pressure, and means responsive to the action of the speed adjusting means to effect a momentary reduction in pressure selections depending on the rapidity of the action of the speed adjusting means to increase supercharger speed.

50. Pressure control apparatus of supercharged internal combustion engines comprising, in combination, means for controlling a throttle valve in order to maintain a certain pressure in the engine intake, apparatus for adjusting the speed of a supercharger, means rendered effective to cause the speed adjusting means to increase the speed of the supercharger in response to movement of the throttle valve into wide open position, and means effective to a degree determined by the rapidity of operation of the speed adjusting means to increase supercharger speed for effecting a partial closing movement of the throttle valve.

51. Control apparatus for supercharged internal combustion aircraft engines comprising a throttle valve movable to different positions to control the pressure in the engine intake, means for selecting a pressure to be maintained, means controlled by the intake pressure for automatically moving the throttle so as to maintain any selected pressure during operation of the aircraft at different altitudes, a supercharger for said engine, means for driving said supercharger at any desired speed between minimum and maximum limits, means for controlling the supercharger speed, a hydraulic servo motor for actuating the speed controlling means of the supercharger, a valve for controlling the operation of said servo motor, means for operating said valve to render the servo motor effective as the throttle is moved to a predetermined position by the throttle operating mechanism and means for retarding the operation of the servo motor as it actuates the means for controlling the supercharger speed.

52. Control apparatus for supercharged internal combustion aircraft engines comprising a throttle valve movable to different positions to control the pressure in the engine intake, means for selecting a pressure to be maintained, means controlled by the intake pressure for automatically moving the throttle so as to maintain any selected pressure during operation of the aircraft at different altitudes, a supercharger for said engine, means for driving said supercharger at any desired speed between minimum and maximum limits, means for controlling the supercharger speed, a hydraulic servo motor for actuating the speed controlling means of the supercharger, a valve for controlling the operation of said servo motor, means for operating said valve to render the servo motor effective as the throttle is moved to a predetermined position by the throttle operating mechanism, means for retarding the operation of the servo motor as it actuates the means for controlling the supercharger speed and means operated by said retarding means for modifying the pressure selection.

53. For use with an internal combustion engine having a throttle controlled induction passage provided with a supercharging system including a supercharger and a fluid coupling for varying the ratio of engine-to-supercharger speed, power control mechanism including a hydraulic power or servo motor for operating the throttle, a servo or pilot valve for said motor, a selectively operable power control member, variable datum means including a manifold pressure aneroid having an operable connection with said member and said servo valve for automatically positioning the throttle to maintain a selected charge pressure at varying air densities, a device for varying the effective fluid fill of said coupling, hydraulic means for operating said device, and another servo or pilot valve for said hydraulic means, said latter valve being coordinated with said first-named servo valve and arranged to open at nearly wide open throttle and pass fluid to said hydraulic means.

References Cited in the file of this patent

UNITED STATES PATENTS

| Number | Name | Date |
|---|---|---|
| 2,217,364 | Halford | Oct. 8, 1940 |
| 2,336,844 | Buck | Dec. 14, 1943 |
| 2,358,363 | Truesdeel | Sept. 19, 1944 |
| 2,383,719 | Halford et al. | Aug. 28, 1945 |
| 2,384,353 | Stieglitz | Sept. 4, 1945 |
| 2,389,003 | Schorn | Nov. 13, 1945 |
| 2,396,618 | Stieglitz et al. | Mar. 12, 1946 |
| 2,400,306 | Hobbs | May 14, 1946 |
| 2,400,307 | Hobbs et al. | May 14, 1946 |
| 2,403,399 | Reggio | July 2, 1946 |
| 2,407,317 | Mannesson | Sept. 10, 1946 |
| 2,428,531 | Schorn | Oct. 7, 1947 |
| 2,486,212 | Schorn et al. | Oct. 25, 1949 |
| 2,503,274 | Jorgensen et al. | Apr. 11, 1950 |